United States Patent
Wang et al.

(10) Patent No.: US 10,568,130 B2
(45) Date of Patent: Feb. 18, 2020

(54) TECHNIQUES AND APPARATUSES FOR MULTIPLE TYPES OF PHYSICAL RANDOM ACCESS CHANNEL (PRACH) TRANSMISSION UTILIZATION

(71) Applicant: QUALCOMM Incorporated, San Diego, CA (US)

(72) Inventors: Renqiu Wang, San Diego, CA (US); Hung Ly, San Diego, CA (US); Haitong Sun, Cupertino, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/707,659

(22) Filed: Sep. 18, 2017

(65) Prior Publication Data

US 2018/0184447 A1 Jun. 28, 2018

Related U.S. Application Data

(60) Provisional application No. 62/438,172, filed on Dec. 22, 2016.

(51) Int. Cl.
| | | |
|---|---|---|
| *H04W 74/00* | (2009.01) | |
| *H04L 1/08* | (2006.01) | |
| *H04L 1/00* | (2006.01) | |
| *H04W 28/18* | (2009.01) | |

(Continued)

(52) U.S. Cl.
CPC ......... *H04W 74/004* (2013.01); *H04L 1/0009* (2013.01); *H04L 1/08* (2013.01);
(Continued)

(58) Field of Classification Search
CPC ............. H04W 28/18; H04W 74/0833; H04W 74/0866; H04W 74/0891; H04W 74/004;
(Continued)

(56) References Cited

U.S. PATENT DOCUMENTS

2009/0305693 A1* 12/2009 Shimomura ........ H04W 74/004
455/422.1
2010/0009688 A1 1/2010 Lim et al.
(Continued)

FOREIGN PATENT DOCUMENTS

WO WO-2016168024 A1 10/2016

OTHER PUBLICATIONS

Interdigital Communications: "Random Access Procedure", 3GPP Draft; R1-1612311, 3rd Generation Partnership Project (3GPP), Mobile Competence Centre; 650, Route Des Lucioles; F-06921 Sophia-Anti Polls Cedex; France, vol. RAN WG1, No. Reno, USA; Nov. 13, 2016, XP051176260, Retrieved from the Internet: URL:http://www.3gpp.org/ftp/Meetings_3GPP_SYNC/RAN1/Docs/ [retrieved on Nov. 13, 2016], 4 pages.
(Continued)

*Primary Examiner* — Quoc Thai N Vu
(74) *Attorney, Agent, or Firm* — Harrity & Harrity, LLP\Qualcomm

(57) ABSTRACT

A user equipment (UE) may perform a random access procedure to synchronize with a network for uplink and/or downlink communication. The UE may transmit a first type of random access transmission that includes transmitting a preamble or a second type of random access transmission that includes transmitting a preamble and a random access message. The second type may result in reduced delay but may have lesser SNR tolerance than the first type. In some aspects, the UE may determine whether to transmit the first type or the second type, and may transmit the first type or the second type in a random access channel portion of a slot. The random access channel portion of the slot may be occupied by portions of either the first type of random access transmission or the second type of random access transmis-
(Continued)

sion, thereby enabling flexible utilization of multiple types of random access procedure.

81 Claims, 18 Drawing Sheets

(51) Int. Cl.
    *H04W 72/04*     (2009.01)
    *H04W 74/08*     (2009.01)
    *H04L 5/00*     (2006.01)

(52) U.S. Cl.
    CPC ....... *H04W 28/18* (2013.01); *H04W 72/0446* (2013.01); *H04W 74/006* (2013.01); *H04W 74/0833* (2013.01); *H04W 74/0891* (2013.01); *H04L 5/0094* (2013.01); *H04W 72/0453* (2013.01)

(58) Field of Classification Search
    CPC ......... H04W 72/0446; H04W 72/0453; H04W 74/006; H04W 74/002; H04L 5/0094; H04L 1/08; H04L 1/0009
    See application file for complete search history.

(56) References Cited

U.S. PATENT DOCUMENTS

| | | | | |
|---|---|---|---|---|
| 2010/0135210 A1* | 6/2010 | Kim | ............... | H04L 1/06 370/328 |
| 2010/0296436 A1* | 11/2010 | Kwon | ............... | H04J 13/0059 370/328 |
| 2012/0106467 A1* | 5/2012 | Takahashi | ............... | H04W 74/006 370/329 |
| 2013/0223331 A1* | 8/2013 | Chun | ............... | H04W 72/04 370/315 |
| 2013/0301567 A1* | 11/2013 | Jeong | ............... | H04W 74/0833 370/329 |
| 2015/0016312 A1* | 1/2015 | Li | ............... | H04W 74/0833 370/280 |
| 2016/0095094 A1* | 3/2016 | Xu | ............... | H04W 72/042 370/336 |
| 2018/0103465 A1* | 4/2018 | Agiwal | ............... | H04W 72/0413 |

OTHER PUBLICATIONS

International Search Report and Written Opinion—PCT/US2017/058729—ISA/EPO—dated Jan. 30, 2018.

Qualcomm Incorporated: "Single Beam RACH Design", 3GPP Draft; R1-1612030, 3rd Generation Partnership Project (3GPP), Mobile Competence Centre; 650, Route Des Lucioles; F-06921 Sophia-Anti Polls Cedex; France, vol. RAN WG1, No. Reno, USA; Nov. 13, 2016, XP051175991, Retrieved from the Internet: URL:http://www.3gpp.org/ftp/Meetings_3GPP_SYNC/RAN1/Docs/ [retrieved on Nov. 13, 2016], 3 pages.

* cited by examiner

Second Type of Random Access Transmission
- Cyclic Prefix
- Preamble
- RACH message First Type of Random Access Transmission
- Cyclic Prefix
- Preamble

300

TECHNIQUES AND APPARATUSES FOR MULTIPLE TYPES OF PHYSICAL RANDOM ACCESS CHANNEL (PRACH) TRANSMISSION UTILIZATION

CROSS-REFERENCE TO RELATED APPLICATIONS UNDER 35 U.S.C. § 119

This application claims priority to U.S. Provisional Patent Application 62/438,172 filed on Dec. 22, 2016 entitled "TECHNIQUES AND APPARATUSES FOR MULTIPLE TYPES OF PHYSICAL RANDOM ACCESS CHANNEL (PRACH) TRANSMISSION UTILIZATION," which is incorporated by reference herein.

BACKGROUND

Field

Aspects of the present disclosure generally relate to wireless communication, and more particularly to techniques and apparatuses for multiple types of physical random access channel (PRACH) transmission utilization.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

A user equipment (UE) may perform a random access procedure to obtain access to a network for uplink transmission, downlink transmission, and/or the like. To perform the random access procedure, the UE and a base station may exchange messages. For some UEs, the random access procedure, such as a physical random access channel (PRACH) random access procedure, may include transmitting multiple messages to the base station. For example, the UE may transmit a random access transmission including a preamble, may receive a response message from the base station, may transmit a random access transmission including a random access message, and may receive another response message from the base station. This may be termed a four-step random access procedure, and the initial random access transmission may be termed a first type of random access transmission. After completion of the four message random access procedure, the UE may be synchronized to perform uplink and/or downlink transmission.

SUMMARY

The four-step random access procedure may result in excessive delay and/or an excessive amount of network traffic. Thus in 5G, the UE may combine transmission of the preamble and the random access message into a single random access transmission, to which the UE may receive a single response message. This may be termed a two-step random access procedure and the random access transmission may be termed a second type of random access transmission. In this case, the UE may receive the single response message after transmitting the second type of random access transmission, and may be synchronized to perform uplink and/or downlink transmission without another message exchange. In this way, the two-step random access procedure reduces delay associated with connecting to the network.

The two-step random access procedure may necessitate improved channel conditions relative to the four-step random access procedure. For example, when the UE transmits the second type of random access transmission in a network with relatively poor channel conditions, such as a signal to noise ratio (SNR) that fails to satisfy a threshold, the second type of random access transmission may fail to be received and/or decoded by the base station. In contrast, the UE may transmit the first type of random access transmission when the SNR fails to satisfy the threshold, and the first type of random access transmission may be successfully received and/or decoded as a result of the reduced size of first type of random access transmission. Thus, it may be beneficial to permit utilization of multiple types of random access transmissions associated with multiple types of random access procedures in a network to account for differing channel conditions.

Aspects described herein may enable utilization of multiple types of random access transmissions (e.g., physical random access channel (PRACH) transmissions) associated with a two-step random access procedure, a four-step random access procedure, and/or the like. A first type of random access transmission or a second type of random access transmission may be utilized based at least in part on, for example, channel conditions of a network. Thus, a likelihood of failure to synchronize a user equipment (UE) to a network for uplink and/or downlink when channel conditions are relatively poor is reduced by enabling a first type of random access transmission relative to permitting only the second type of random access transmission under all channel conditions. Similarly, an amount of time to synchronize the UE to the network when channel conditions are good is reduced by enabling the second type of random access transmission relative to permitting only the first type of random access transmission under all channel conditions.

In an aspect of the disclosure, a method, a device, an apparatus, and a computer program product are provided.

In some aspects, the method may include determining, by a user equipment, whether to transmit at least one of a first type of random access transmission or a second type of random access transmission within a random access channel portion of a slot. The first type of random access transmission may include a preamble. The second type of random access transmission may include the preamble and a random access message. The method may include transmitting, by the user equipment, the at least one of the first type of random access transmission or the second type of random access transmission within the random access channel portion of the slot.

In some aspects, the device may include a memory and one or more processors coupled to the memory. The memory and the one or more processors may be configured to determine whether to transmit at least one of a first type of random access transmission or a second type of random access transmission within a random access channel portion of a slot. The first type of random access transmission may include a preamble. The second type of random access transmission may include the preamble and a random access message. The memory and the one or more processors may be configured to transmit the at least one of the first type of random access transmission or the second type of random access transmission within the random access channel portion of the slot.

In some aspects, the apparatus may include means for determining whether to transmit at least one of a first type of random access transmission or a second type of random access transmission within a random access channel portion of a slot. The first type of random access transmission may include a preamble. The second type of random access transmission may include the preamble and a random access message. The apparatus may include means for transmitting the at least one of the first type of random access transmission or the second type of random access transmission within the random access channel portion of the slot.

In some aspects, the computer program product may include a non-transitory computer-readable medium storing one or more instructions for wireless communication that, when executed by one or more processors of a device, cause the one or more processors to determine whether to transmit at least one of a first type of random access transmission or a second type of random access transmission within a random access channel portion of a slot. The first type of random access transmission may include a preamble. The second type of random access transmission may include the preamble and a random access message. The one or more instructions may cause the one or more processors to transmit the at least one of the first type of random access transmission or the second type of random access transmission within the random access channel portion of the slot.

In some aspects, the method may include monitoring for both a first type of random access transmission and a second type of random access transmission within a random access channel portion of a slot, wherein the first type of random access transmission includes a preamble, and wherein the second type of random access transmission includes the preamble and a random access message. The method may include receiving, from at least one user equipment, at least one of the first type of random access transmission or the second type of random access transmission within the random access channel portion of the slot based at least in part on monitoring for both the first type of random access transmission and the second type of random access transmission.

In some aspects, the device may include a memory and one or more processors coupled to the memory. The memory and the one or more processors may be configured to monitor for both a first type of random access transmission and a second type of random access transmission within a random access channel portion of a slot, wherein the first type of random access transmission includes a preamble, and wherein the second type of random access transmission includes the preamble and a random access message. The memory and the one or more processors may be configured to receive, from at least one user equipment, at least one of the first type of random access transmission or the second type of random access transmission within the random access channel portion of the slot based at least in part on monitoring for both the first type of random access transmission and the second type of random access transmission.

In some aspects, the apparatus may include means for monitoring for both a first type of random access transmission and a second type of random access transmission within a random access channel portion of a slot, wherein the first type of random access transmission includes a preamble, and wherein the second type of random access transmission includes the preamble and a random access message. The apparatus may include means for receiving, from at least one user equipment, at least one of the first type of random access transmission or the second type of random access transmission within the random access channel portion of the slot based at least in part on monitoring for both the first type of random access transmission and the second type of random access transmission.

In some aspects, the computer program product may include a non-transitory computer-readable medium storing one or more instructions for wireless communication that, when executed by one or more processors of a device, cause the one or more processors to monitor for both a first type of random access transmission and a second type of random access transmission within a random access channel portion of a slot, wherein the first type of random access transmission includes a preamble, and wherein the second type of random access transmission includes the preamble and a random access message. The one or more instructions, when executed by the one or more processors, may cause the one or more processors to receive, from at least one user equipment, at least one of the first type of random access transmission or the second type of random access transmission within the random access channel portion of the slot based at least in part on monitoring for both the first type of random access transmission and the second type of random access transmission.

Aspects generally include a method, apparatus, system, computer program product, non-transitory computer-readable medium, user equipment, wireless communication device, base station, access point, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
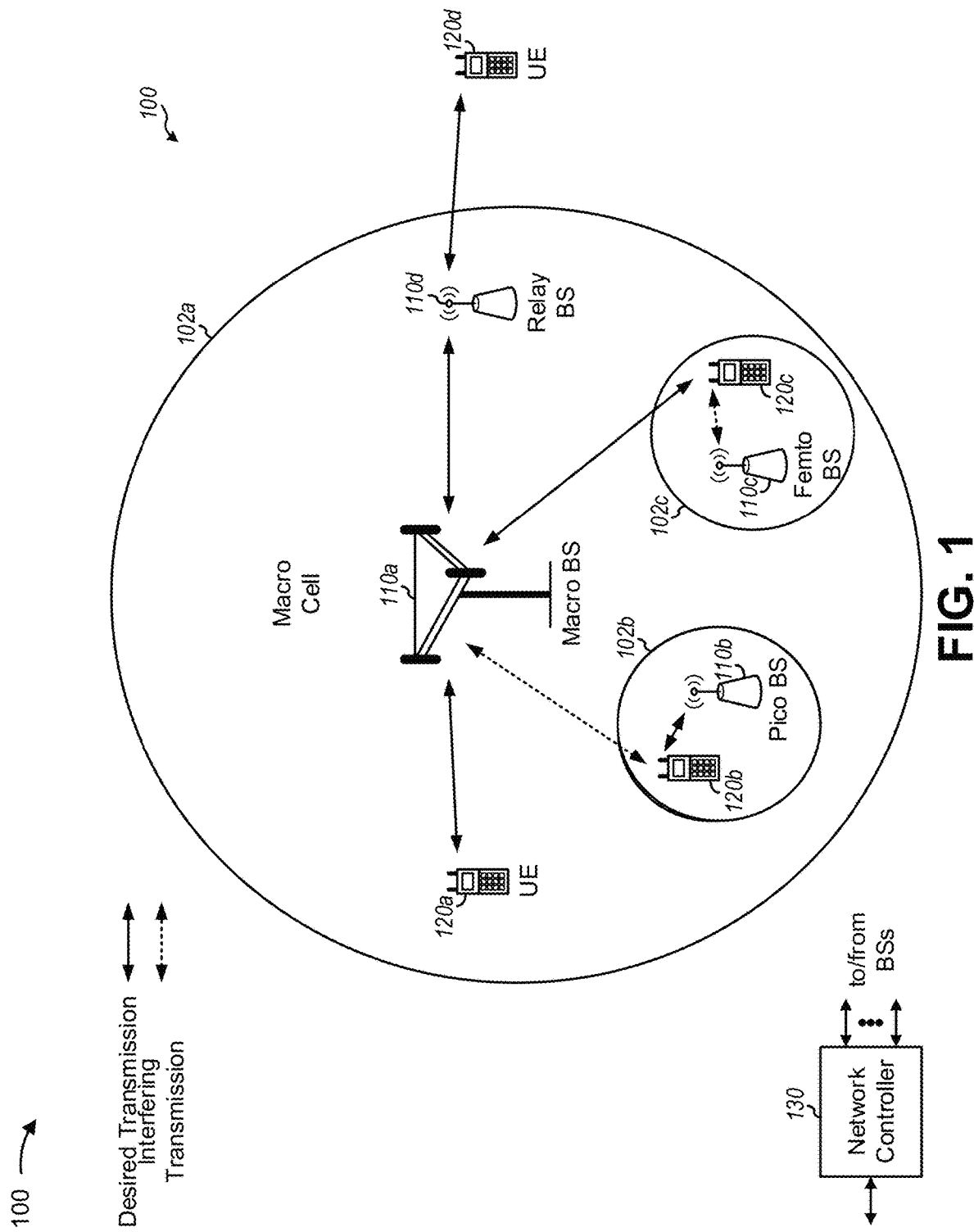
FIG. 1 is diagram| illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a 5G BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may communicate with the BSs to select a schedule for multiple types of random access transmissions. For example, network controller 130 may determine that a first plurality of grid units of a grid of network resources in a random access channel portion of a slot (e.g., frequency resources, time resources, cyclic shifts, etc.) is to be allocated for a first type of random access transmission and a second plurality of grid units of the grid of network resources in the random access channel portion of the slot is to be allocated for a second type of random access transmission.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station, a network controller, a user equipment, etc.) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. For example, the scheduling entity may schedule an allocation of a grid of units of network resources for utilization for multiple types of random access transmissions. In some aspects, such scheduling information may be communicated via signaling from the scheduling entity. For example, a UE may receive a system information block (SIB) message identifying a schedule for the grid of units of network resources, and may perform a particular type of random access transmission at a particular grid unit of network resources based at least in part on the schedule.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
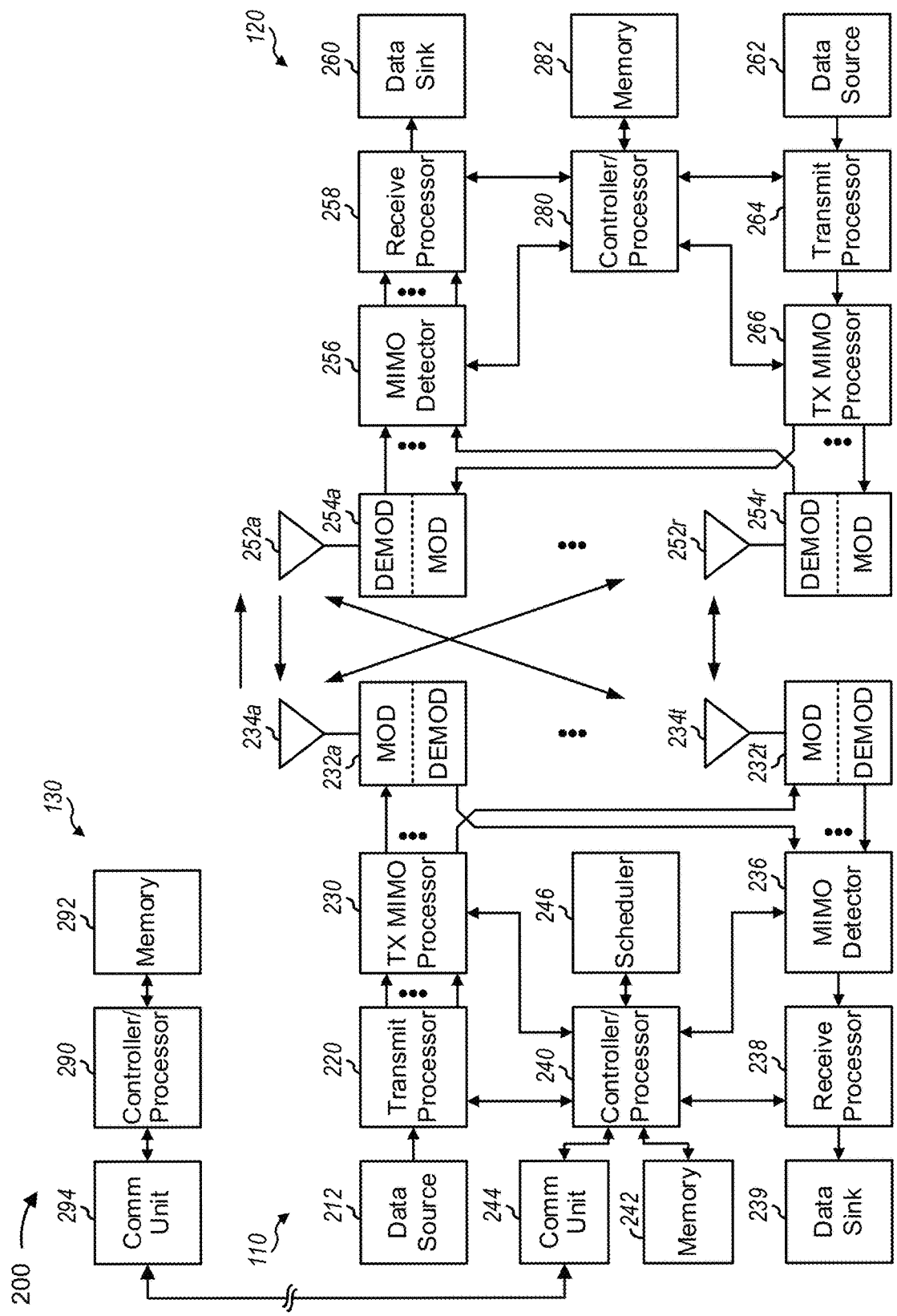
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at BS 110 and UE 120, respectively, to selectively utilize multiple types of random access transmissions, such as a first type of random access transmission including a preamble, a second type of random access transmission including a preamble and a random access message, and/or the like. For example, controller/processors 240 and 280 and/or other processors and modules at BS 110 or UE 120, respectively, may perform or direct operations of BS 110 or UE 120, respectively, to determine whether to use a first type of random access transmission or a second type of random access transmission, and to selectively utilize the first type of random access transmission or the second type of random access transmission to initiate a random access procedure. Additionally, or alternatively, controller/processors 240 and 280 and/or other processors and modules at BS 110 or UE 120, respectively, may perform or direct operations of BS 110 or UE 120, respectively, to monitor for both a first type of random access transmission and a second type of random access transmission within a random access channel portion of a slot, and to receive at least one of the first type of random access transmission or the second type of random access transmission within the random access channel portion of the slot based at least in part on monitoring for both the first type of random access transmission and the second type of random access transmission.

Figure 7:
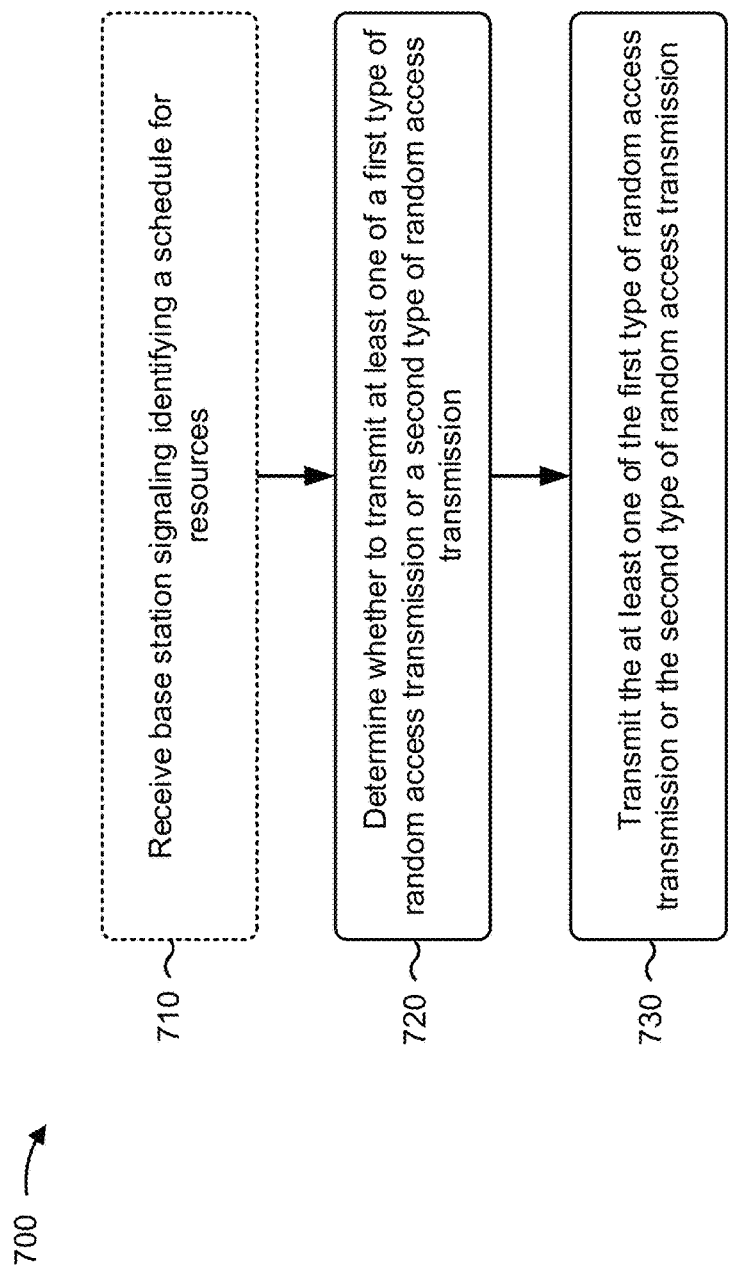
FIG. 7 is a flow chart of a method of wireless communication.
Figure 10:
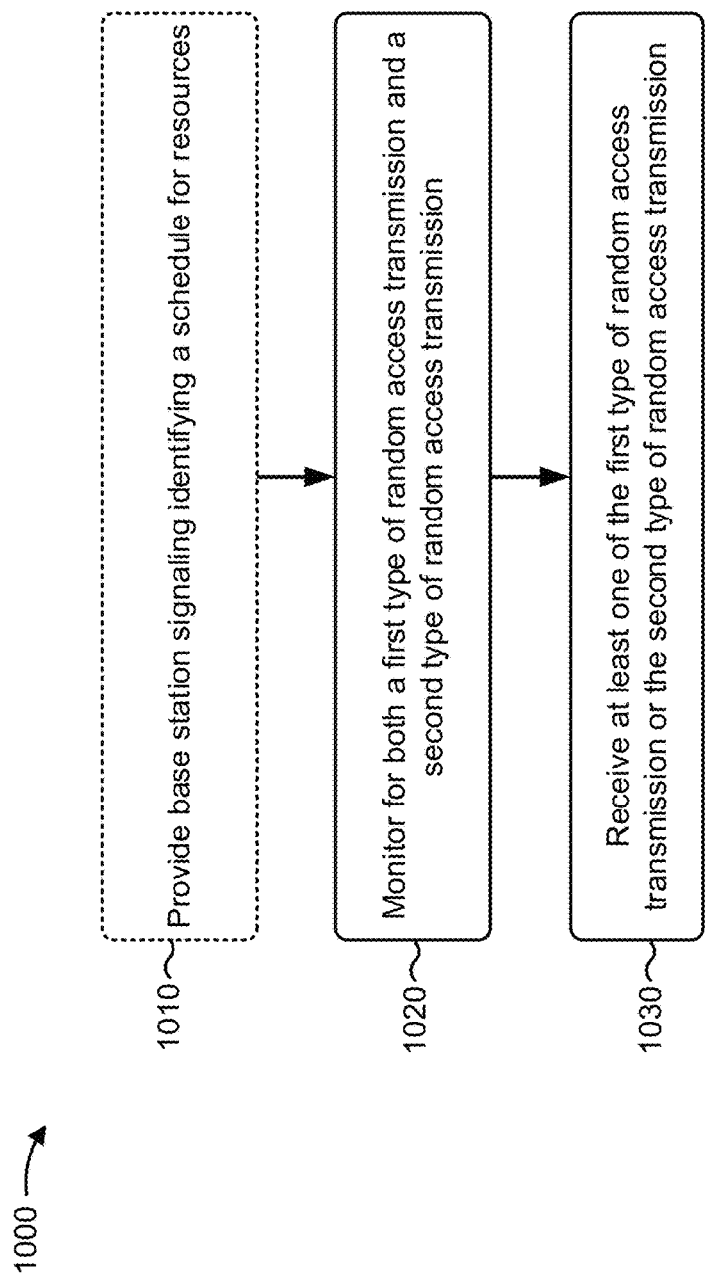
FIG. 10 is a flow chart of a method of wireless communication.

In some aspects, one or more of the components shown in FIG. 2 may be employed to perform example process 700 of FIG. 7, example process 1000 of FIG. 10, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3B:
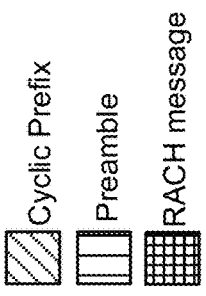
FIGS. 3A and 3B are diagrams illustrating an example of types of random access transmissions for a random access procedure, such as a physical random access channel (PRACH) procedure.
Figure 3B:
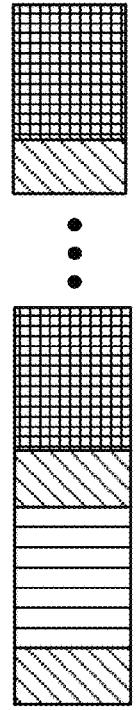
Figure 3A:
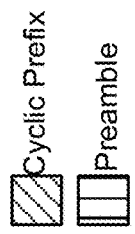
Figure 3A:
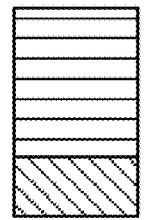

FIGS. 3A and 3B are diagrams illustrating an example 300 of types of random access transmissions for a random access procedure, such as a PRACH random access procedure.

As shown in FIG. 3A, a first type of random access transmission may include a preamble and a cyclic prefix. In some aspects, the first type of random access transmission may be a PRACH random access transmission for a four-step PRACH random access procedure. The preamble may include a random access channel (RACH) preamble. The preamble may be used for detection, timing estimation, and/or the like for the PRACH random access procedure. In some aspects, the cyclic prefix and preamble may be a single unit that can occupy a unit of a grid of units of network resources of a random access procedure portion of a slot, as described herein.

As shown in FIG. 3B, a second type of random access transmission may include a set of a preamble and a set of random access messages, each with a corresponding cyclic prefix. In some aspects, the second type of random access transmission may be a PRACH random access transmission for a two-step PRACH random access procedure. Each of the preamble and the set of random access messages may be associated with a cyclic prefix. The preamble may be used for detection, timing estimation, a demodulation reference signal (DMRS) for message demodulation, and/or the like for the PRACH procedure.

The second type of random access transmission may include a first cyclic prefix, a preamble, and at least one pair of a second cyclic prefix and a random access message. In some aspects, the second type of random access transmission may include a plurality of pairs of the second cycle prefix and the random access message. In some aspects, the first cyclic prefix and the preamble may comprise a first unit that can occupy a unit in a grid of units of a random access channel portion of a slot, and each pair of a second cyclic prefix and a random access message may comprise a second unit that can occupy another unit in the grid of units of the random access channel portion of the slot. In this case, each unit is associated with respective resources of the random access channel portion of the slot (e.g., frequency resources, time resources, cyclic shifts, etc.).

As indicated above, FIGS. 3A and 3B are provided as examples. Other examples are possible and may differ from what was described with respect to FIGS. 3A and 3B.

Figure 4:
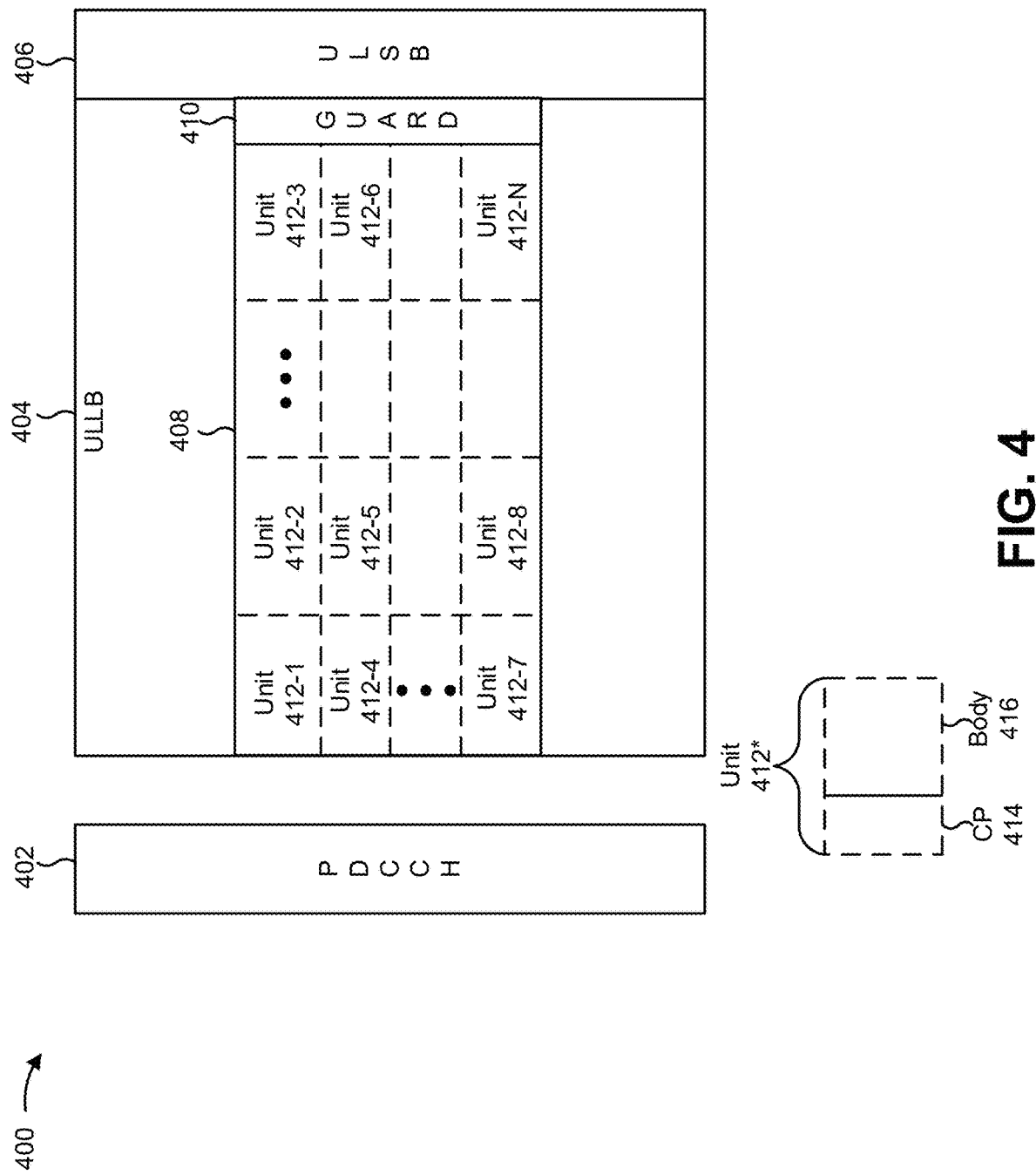
FIG. 4 is a diagram illustrating an example of a grid of units in an uplink-centric slot for multiple types of random access transmission.

FIG. 4 is a diagram illustrating an example 400 of a grid of units in an uplink (UL)-centric slot for multiple types of random access transmission.

As shown in FIG. 4, example 400 includes a physical downlink control channel (PDCCH) portion 402 (PDCCH 402), an uplink long burst (ULLB) portion 404 (ULLB 404), and an uplink short burst (ULSB) portion 406 (ULSB 406).

PDCCH 402 is a downlink control portion of the UL-centric slot, and may be located at a beginning of the UL-centric slot and may be allocated to convey downlink control information, such as a schedule of a grid of units for multiple types of random access transmission.

ULLB 404 is an uplink long burst portion of the UL-centric slot, and may be located between the PDCCH 402 and the ULSB 406 in the UL-centric slot. The ULLB 404 may sometimes be referred to as the payload of the UL-centric slot. The ULLB 404 may refer to the communication resources utilized to communicate UL data from a subordinate entity (e.g., a UE) to a scheduling entity (e.g., a BS). In some aspects, the ULLB 404 may be used for communications on a physical UL shared channel (PUSCH) and/or a physical uplink control channel (PUCCH).

ULLB 404 may include a random access channel portion 408 of the UL-centric slot and a guard portion 410 of the UL-centric slot. Random access channel portion 408 may include a set of network resources of a UL-centric slot allocated for a random access transmission, such as a PRACH random access transmission. Random access channel portion 408 may include a grid of units 412, such as units 412-1 through 412-N (N≥1). Each unit 412 may be occupied by a portion of at least one of multiple types of random access transmission. For example, unit 412\* may include a cyclic prefix (CP) 414 and a body 416. Body 416 may convey a preamble, a random access message, and/or the like. Thus, unit 412* may convey a cyclic prefix and a preamble of the first type of random access transmission, a cyclic prefix and a preamble of the second type of random access transmission, a cyclic prefix and a random access message of the second type of random access transmission, and/or the like. In this way, UE 120 may transmit at least one part of the first type of random access transmission or the second type of random access transmission in a unit 412 of network resources. In some aspects, a plurality of units 412 may be scheduled for a common user (i.e., a single UE 120). In some aspects, a first plurality of units 412 may be scheduled for a first user (i.e., a first UE 120) and a second plurality of units 412 may be scheduled for a second user (i.e., a second UE 120). Guard portion 410 may include a portion of network resources allocated as a time separation to provide time for switchover from PRACH transmission in ULLB 404 to another transmission (e.g., PUSCH or PUCCH) in ULSB 406. In some aspects, guard portion 410 may be referred to as a gap, a guard interval, and/or various other suitable terms.

ULSB 406 is an uplink short burst portion of the UL-centric slot, and may be located at the end of a UL-centric slot. ULSB 406 may sometimes be referred to as a common UL portion, an UL burst, an UL burst portion, a common UL burst, a short burst, an UL short burst, a common UL short burst, a common UL short burst portion, and/or various other suitable terms. In some aspects, the ULSB 406 may be used for communications on a physical UL control channel (PUCCH). Additionally, or alternatively, the ULSB 406 may be used for communication of uplink control information (UCI), such as a scheduling request (SR), HARQ information (e.g., PUCCH ACK, a PUSCH ACK, a PUCCH NACK, a PUSCH NACK, and/or the like), a channel quality indicator (CQI), a channel state indication (CSI), a buffer status report (BSR), a sounding reference signal (SRS), a demodulation reference signal (DMRS), and/or various other suitable types of information.

As indicated above, FIG. 4 is provided as an example. Other examples are possible and may differ from what was described with respect to FIG. 4.

FIGS. 5A-5E are diagrams illustrating an example 500 of resource allocations within a grid of units in an uplink-centric slot for multiple types of random access transmission.

Figure 5A:
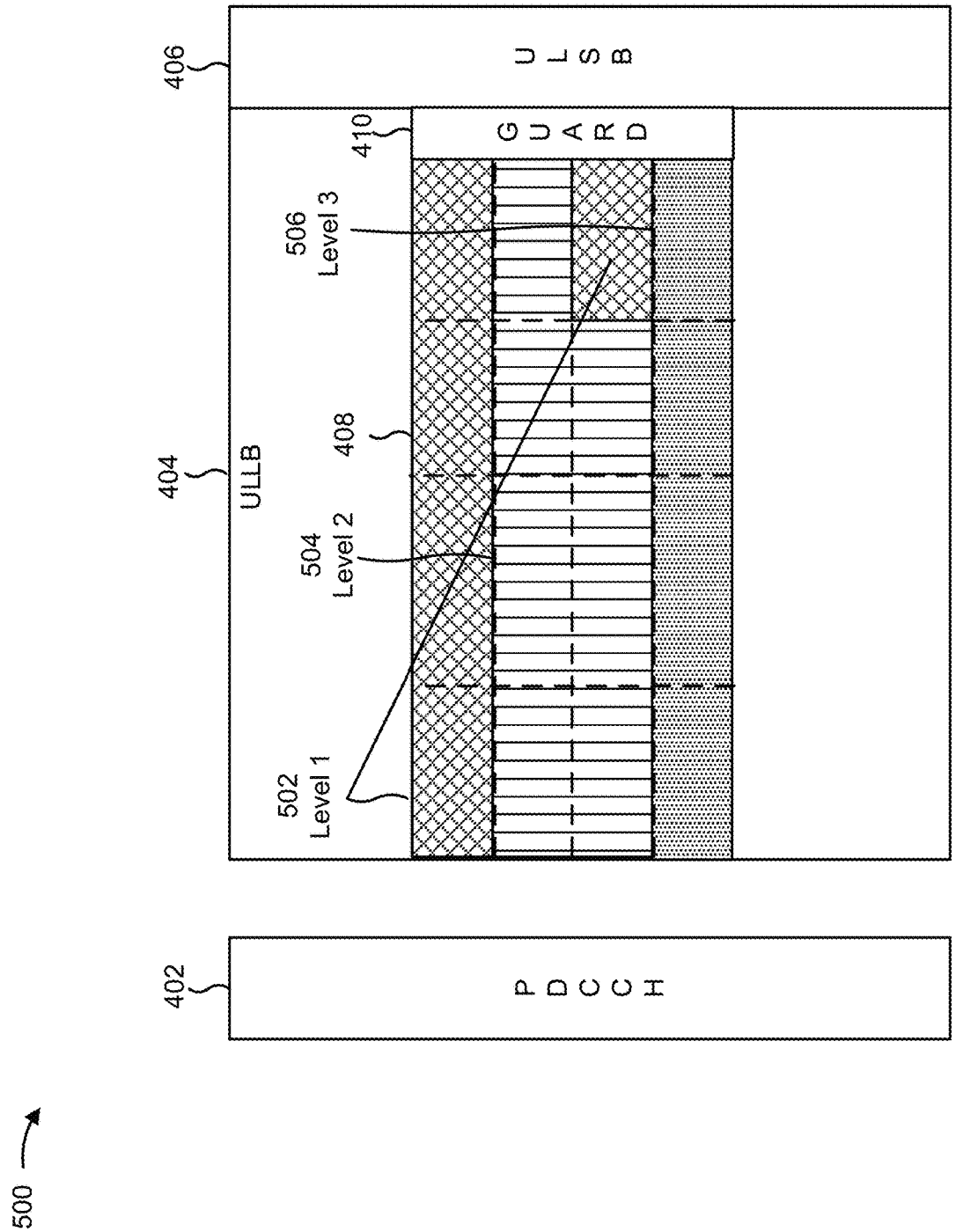
FIGS. 5A-5E are diagrams illustrating examples of resource allocations within a grid of units in an uplink-centric slot for multiple types of random access transmission.

As shown in FIG. 5A, a resource allocation for random access channel portion 408 of ULLB 404 may be scheduled based at least in part on a repetition level of a random access transmission. The repetition level may refer to a number of iterations of the same random access transmission that are to be transmitted.

As shown by reference number 502, a first portion of random access channel portion 408 (e.g., a first set of units 412) is reserved for level 1 repetition of the first type of random access transmission or the second type of random access transmission. Level 1 repetition may refer to a UE 120 transmitting a single iteration of a random access transmission. In some aspects, UE 120 may select the number of repetitions based at least in part on a set of channel conditions. For example, based at least in part on relatively good channel conditions, such as a signal to noise ratio (SNR) satisfying a threshold, a Doppler value satisfying a threshold, and/or the like, UE 120 may determine to transmit a single repetition of the random access transmission. In contrast, when the channel conditions are relatively poor, such as the SNR failing to satisfy a threshold, UE 120 may transmit a plurality of iterations of the random access transmission.

As shown by reference number 504, a second portion of random access channel portion 408 (e.g., a second set of units 412) is reserved for level 2 repetition. Level 2 repetition may refer to the UE 120 transmitting two iterations of a random access transmission, thereby reducing a likelihood that the random access transmission fails to be successfully received and/or decoded by a base station 110. In some aspects, the second portion of random access channel portion 408 and the first portion of random access channel portion 408 may use different resources of the slot. For example, as shown, the first portion and the second portion are assigned different frequency and time resources.

As shown by reference number 506, a third portion of random access channel portion 408 (e.g., a third set of units 412) is reserved for level 3 repetition. Level 3 repetition may refer to the UE 120 transmitting three iterations of a random access transmission. Additionally, or alternatively, other levels of repetition may be possible and may be scheduled in the same or similar portions of random access channel portion 408. In some aspects, a first number of repetitions may be selected for a first user of a first UE 120 and a second number of repetitions may be selected for a second user of a second UE 120, such as based at least in part on channel conditions, information regarding the first user and/or the second user, and/or the like. In some aspects, a first number of repetitions may be selected based at least in part on a first set of channel conditions and a second number of repetitions may be selected based at least in part on a second set of channel conditions.

The resources of the slot used for the first set of units 412, the second set of units 412, and the third set of units 412, shown in FIG. 5A, are provided as examples. Additional, fewer, or different resources could be used for the first set of units 412, the second set of units 412, and/or the third set of units 412.

Figure 5B:
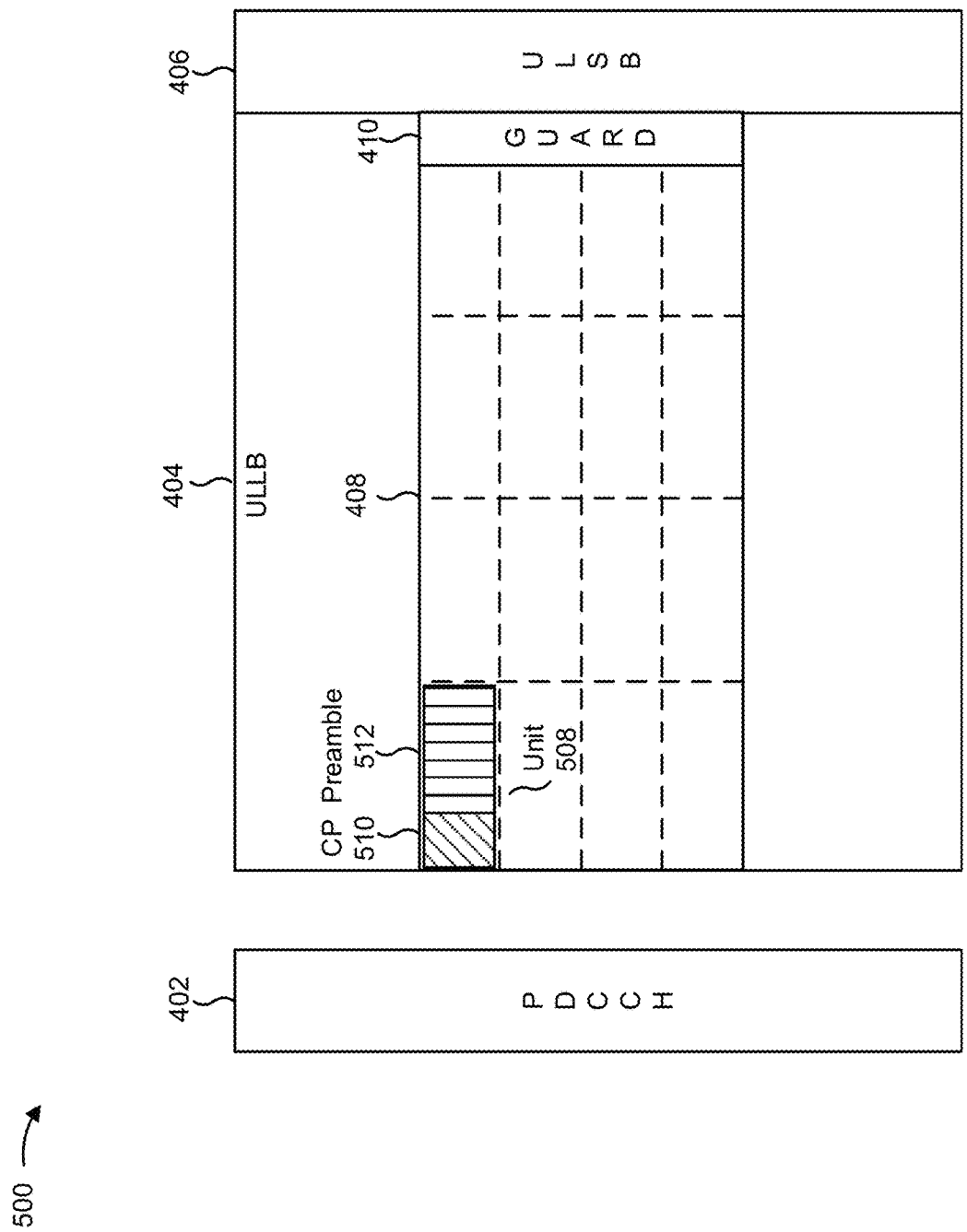

As shown in FIG. 5B, unit 508, of a grid of units 412, is reserved for the first type of random access transmission with level 1 repetition. For example, unit 508 is reserved for cyclic prefix 510 and preamble 512 for the first type of random access transmission.

Figure 5C:
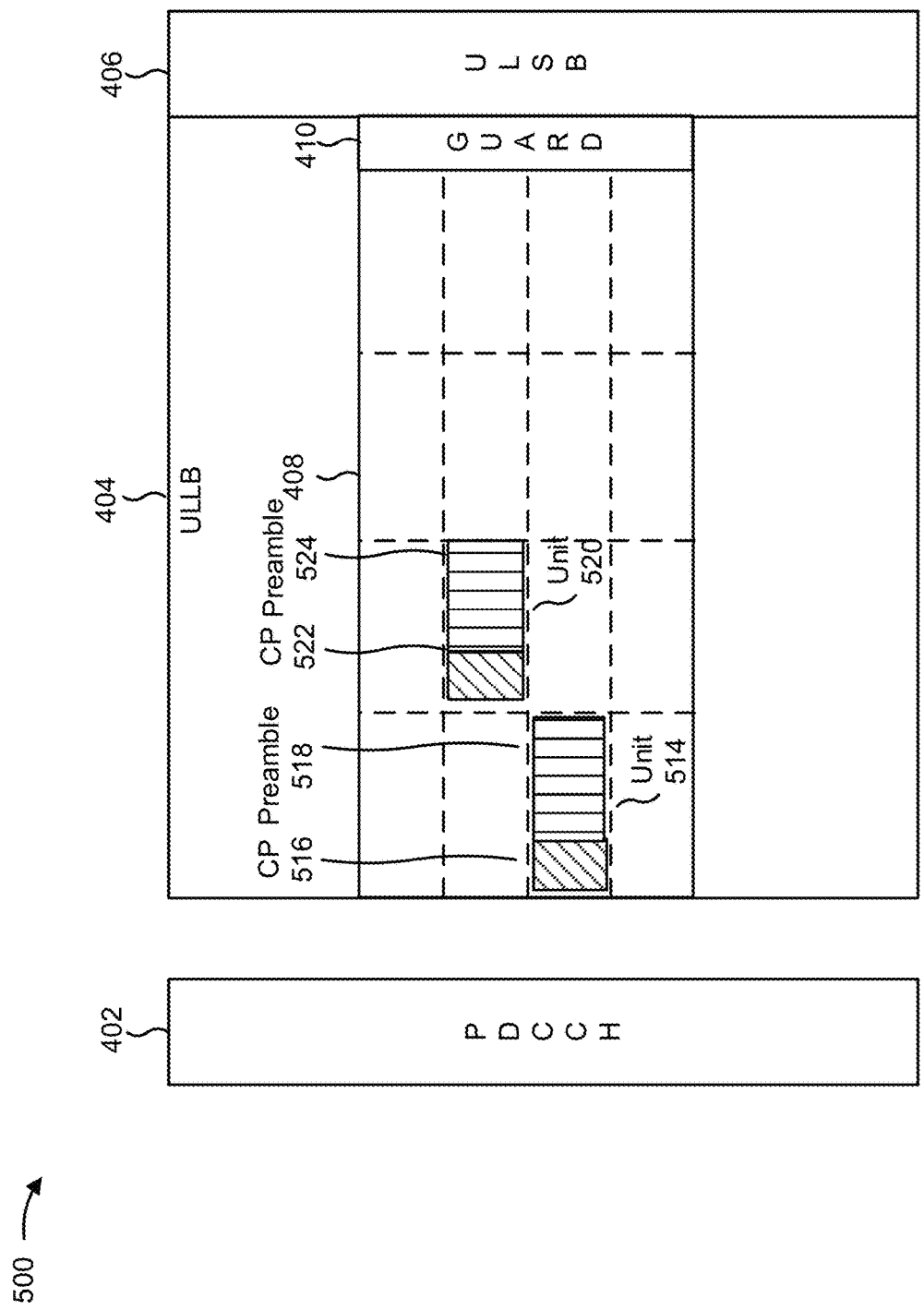

As shown in FIG. 5C, unit 514, of the grid of units 412, is reserved for the first type of random access transmission with level 2 repetition. For example, unit 514 is reserved for cyclic prefix 516 and preamble 518 for the first type of random access transmission.

As further shown, unit 520, of the grid of units 412, is reserved for the first type of random access transmission with level 2 repetition. For example, unit 520 is reserved for cyclic prefix 522 and preamble 524. Cyclic prefix 522 and preamble 524 may be a repetition of cyclic prefix 516 and preamble 518. For example, UE 120 may receive base station signaling, such as a system information block (SIB), from base station 110 indicating that unit 514 and unit 520 are reserved for repetitions of a common random access transmission. This may permit base station 110 to re-combine random access transmissions of unit 514 and unit 520 to reduce a likelihood of failing to receive the random access transmission. In some aspects, UE 120 may frequency hop to transmit multiple repetitions of a common random access transmission. Additionally, or alternatively, different repetition levels may utilize a common time and/or frequency grid but with different cyclic shifts of a common root sequence. For example, units 514 and 520 may be disjoint in resource allocation of frequency, time, root sequence, cyclic shift, and/or the like, and UE 120 may transmit at a scheduled frequency, time, root sequence, cyclic shift, and/or the like associated with units 514 and 520. In this way, UE 120 provides improved SNR tolerance, improved Doppler tolerance, and/or the like relative to transmitting a single random access transmission via a single frequency.

Figure 5D:
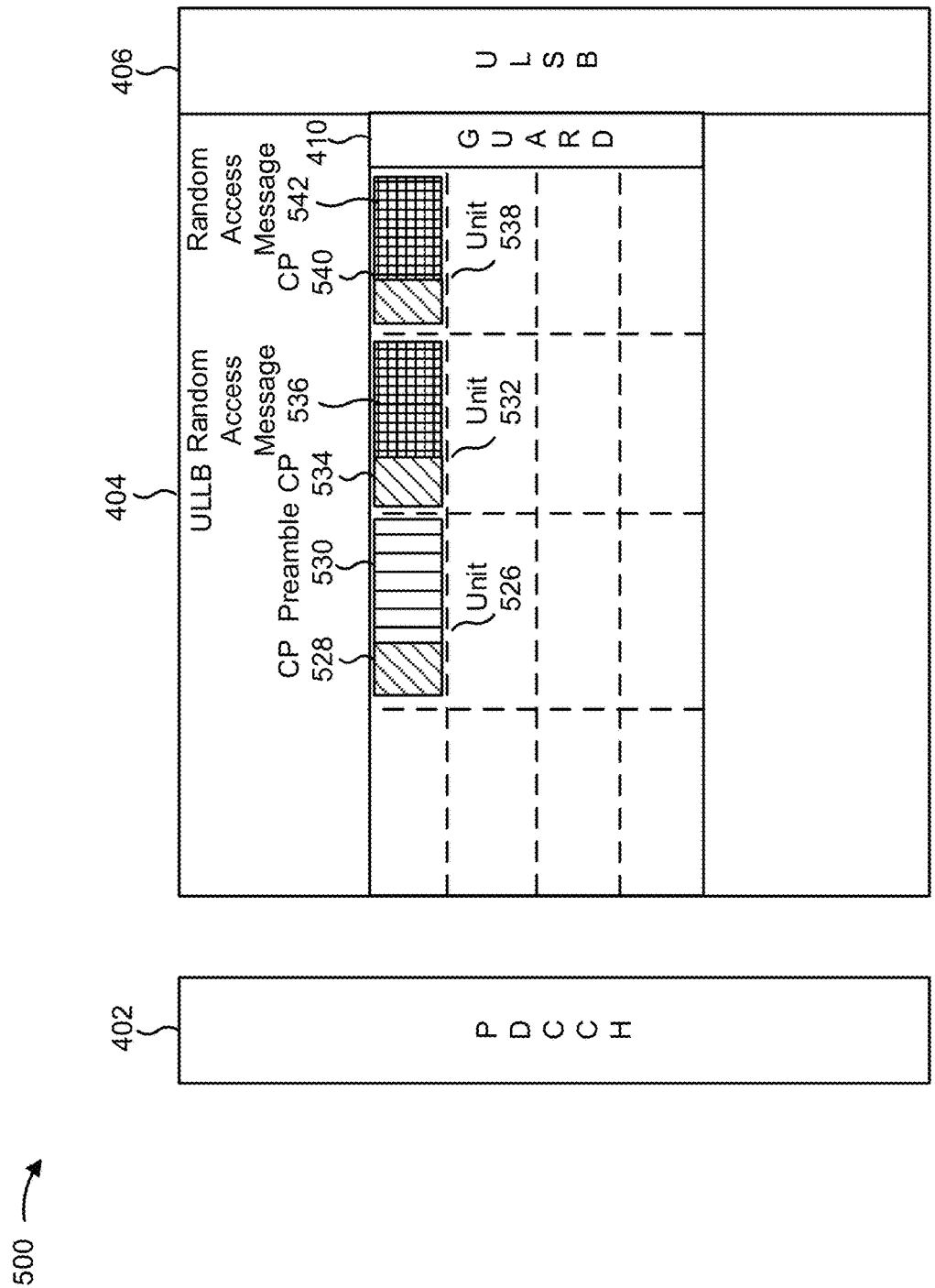

As shown in FIG. 5D, unit 526, of the grid of units 412, is reserved for the second type of random access transmission with level 1 repetition. For example, unit 526 is reserved for a cyclic prefix 528 and a preamble 530 for the second type of random access transmission.

As further shown, unit 532, of the grid of units 412, is reserved for the second type of random access transmission with level 1 repetition. For example, unit 532 is reserved for a cyclic prefix 534 and a random access message 536.

As further shown, unit 538, of the grid of units 412, is reserved for the second type of random access transmission with level 1 repetition. For example, unit 538 is reserved for a cyclic prefix 540 and a random access message 542. In this case, units 526, 532, and 538 may be reserved for a common random access transmission. For example, UE 120 may transmit preamble 530 for detection, timing estimation, DMRS, etc., and may transmit random access messages 536 and 542 to provide a UE-ID parameter, a BSR parameter, and/or the like. In some aspects, units 526, 532, and 538 may be reserved for a random access transmission corresponding to the second type of random access transmission shown in FIG. 3B.

Figure 5E:
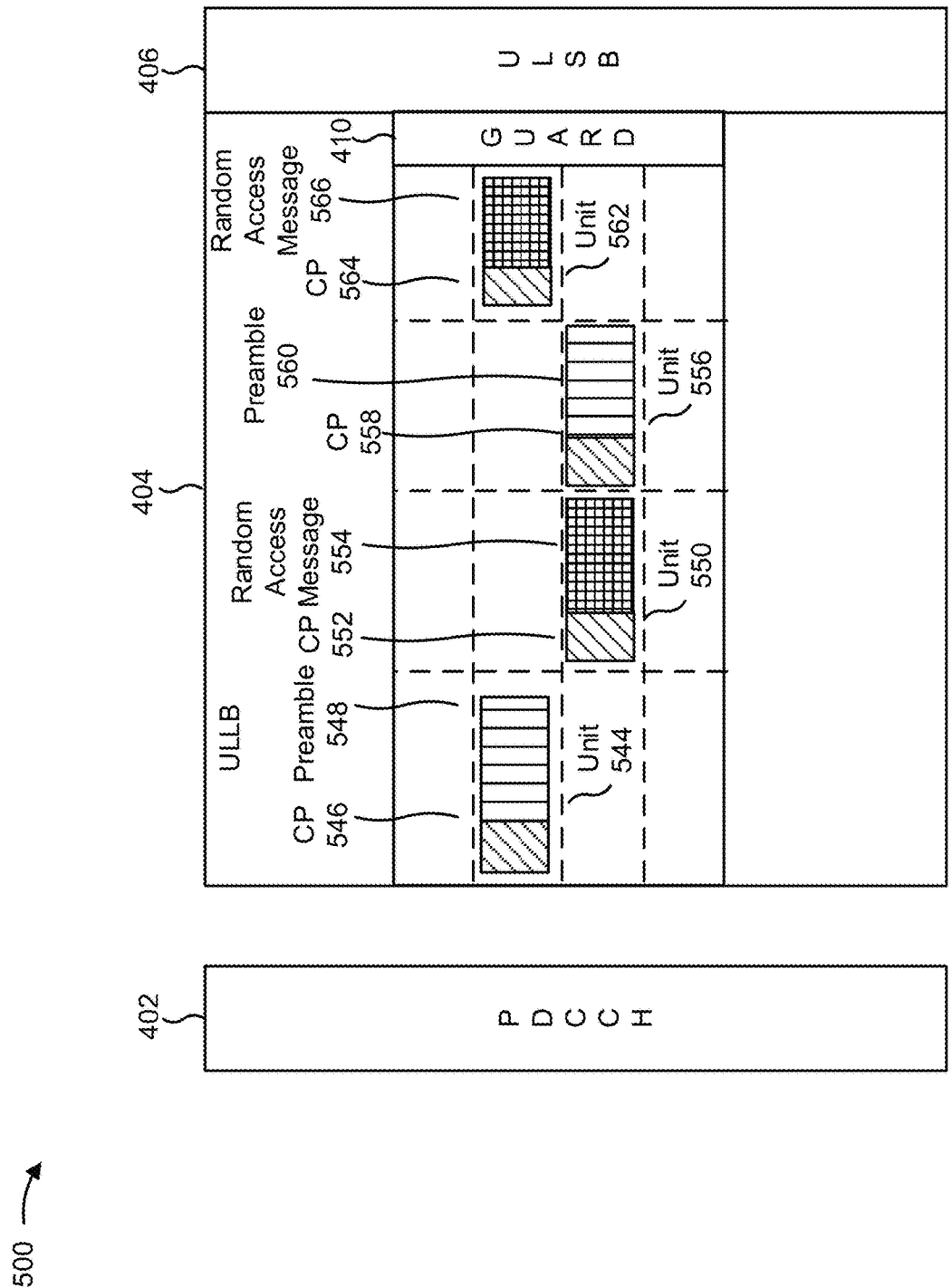

As shown in FIG. 5E, unit 544, of the grid of units 412, is reserved for the second type of random access transmission with level 2 repetition. For example, unit 544 is reserved for a cyclic prefix 546 and a preamble 548 for the second type of random access transmission.

As further shown, unit 550, of the grid of units 412, is reserved for the second type of random access transmission with level 2 repetition. For example, unit 550 is reserved for a cyclic prefix 552 and a random access message 554 for the second type of random access transmission.

As further shown, unit 556, of the grid of units 412, is reserved for the second type of random access transmission with level 2 repetition. For example, unit 556 is reserved for a cyclic prefix 558 and a preamble 560 for the second type of random access transmission. In this case, cyclic prefix 558 and preamble 560 of unit 556 are a repetition of cyclic prefix 546 and preamble 548 of unit 544.

As further shown, unit 562, of the grid of units 412, is reserved for the second type of random access transmission with level 2 repetition. For example, unit 562 is reserved for a cyclic prefix 564 and a random access message 566 for the second type of random access transmission. In this case, cyclic prefix 564 and random access message 566 of unit 562 are a repetition of cyclic prefix 552 and random access message 554 of unit 550. In some aspects, units 544, 550, 556, and 562 may be reserved for repetitions of a common random access transmission. In some aspects, units 544, 550, 556, and 562 may be reserved for the second type of random access transmission shown in FIG. 3B.

As indicated above, FIGS. 5A-5E are provided as examples. Other examples are possible and may differ from what was described with respect to FIGS. 5A-5E.

Figure 6A:
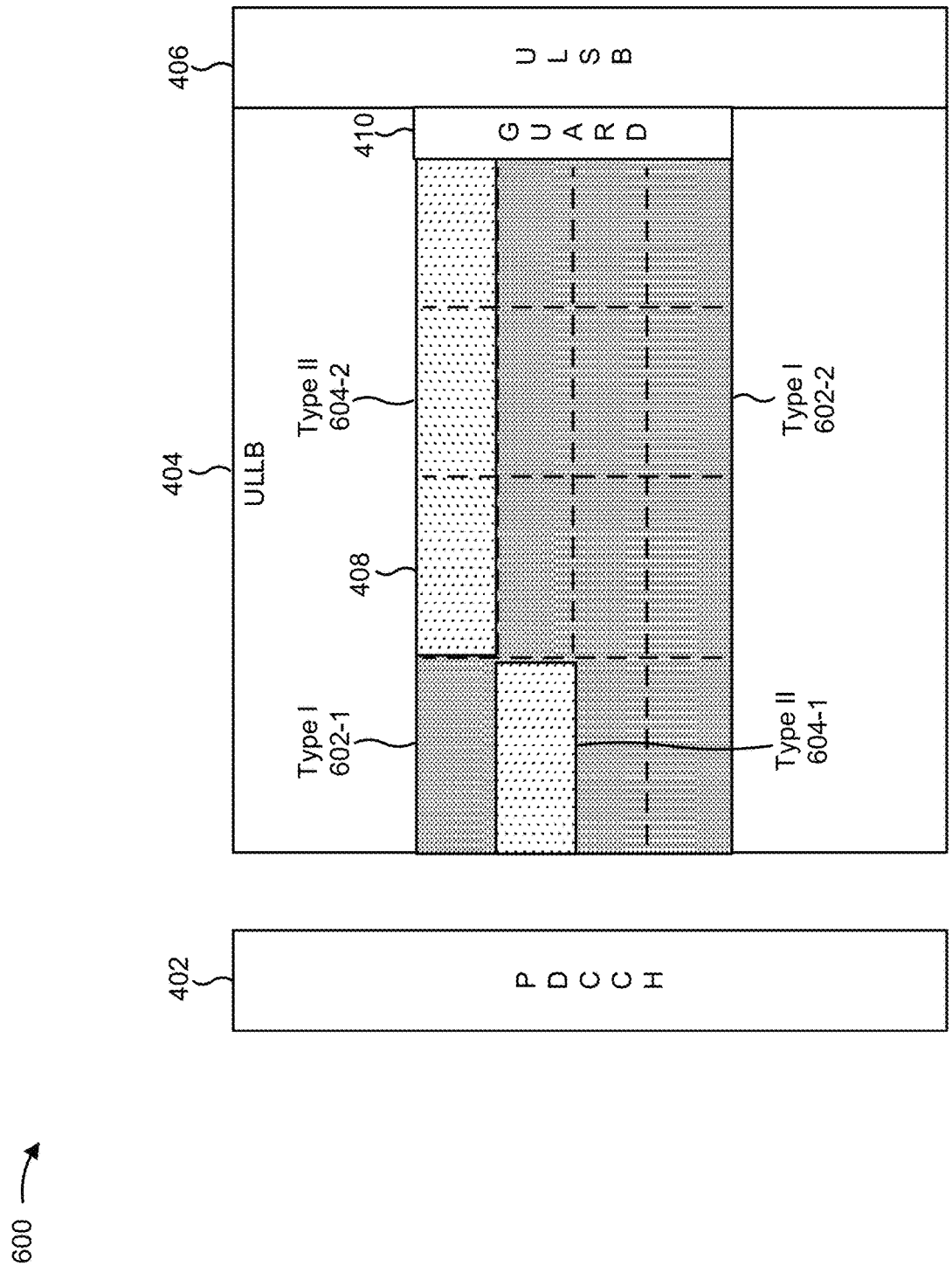
FIGS. 6A-6C are diagrams illustrating examples of resource allocations within a grid of units in an uplink-centric slot for multiple types of random access transmission.
Figure 6B:
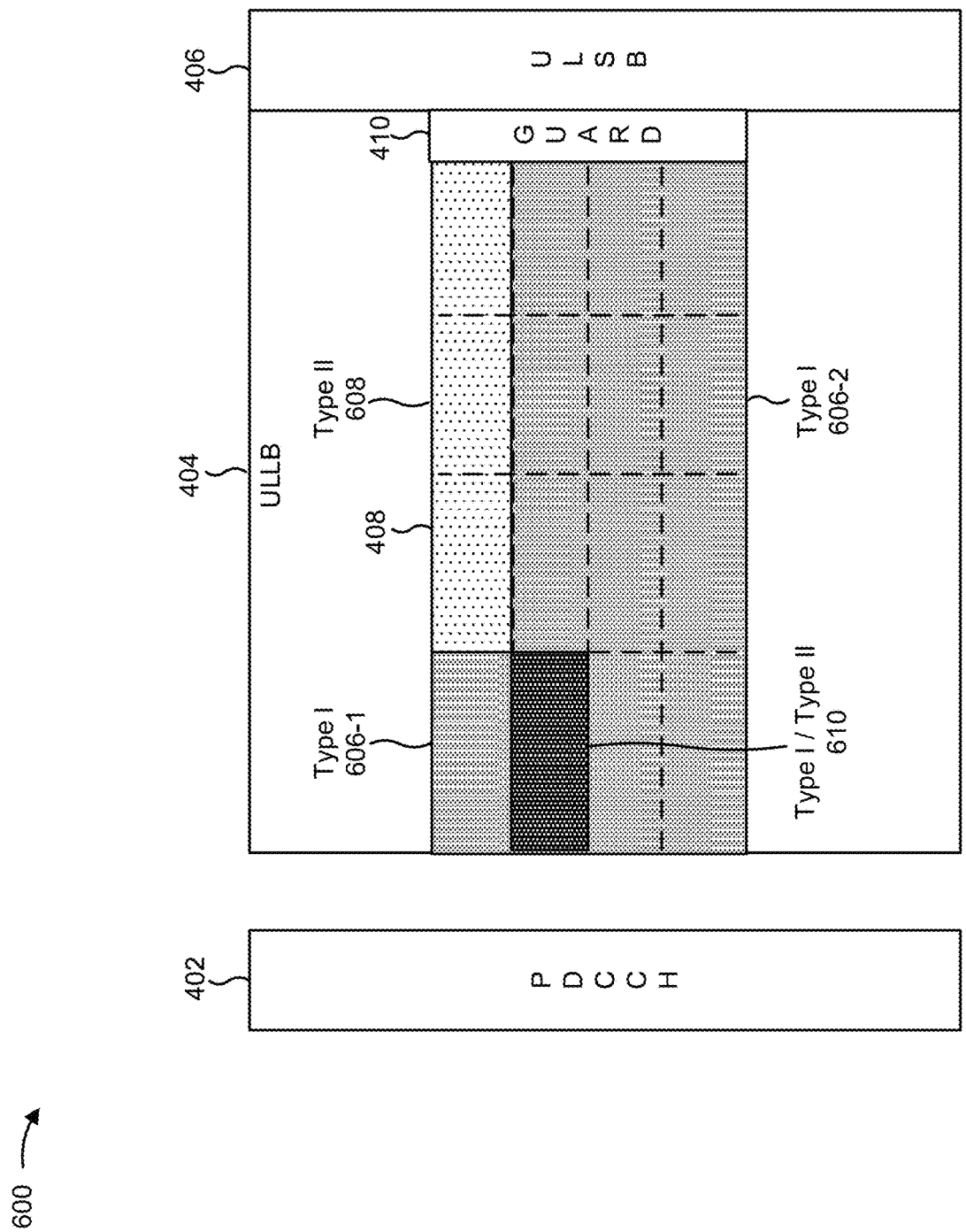
Figure 6C:
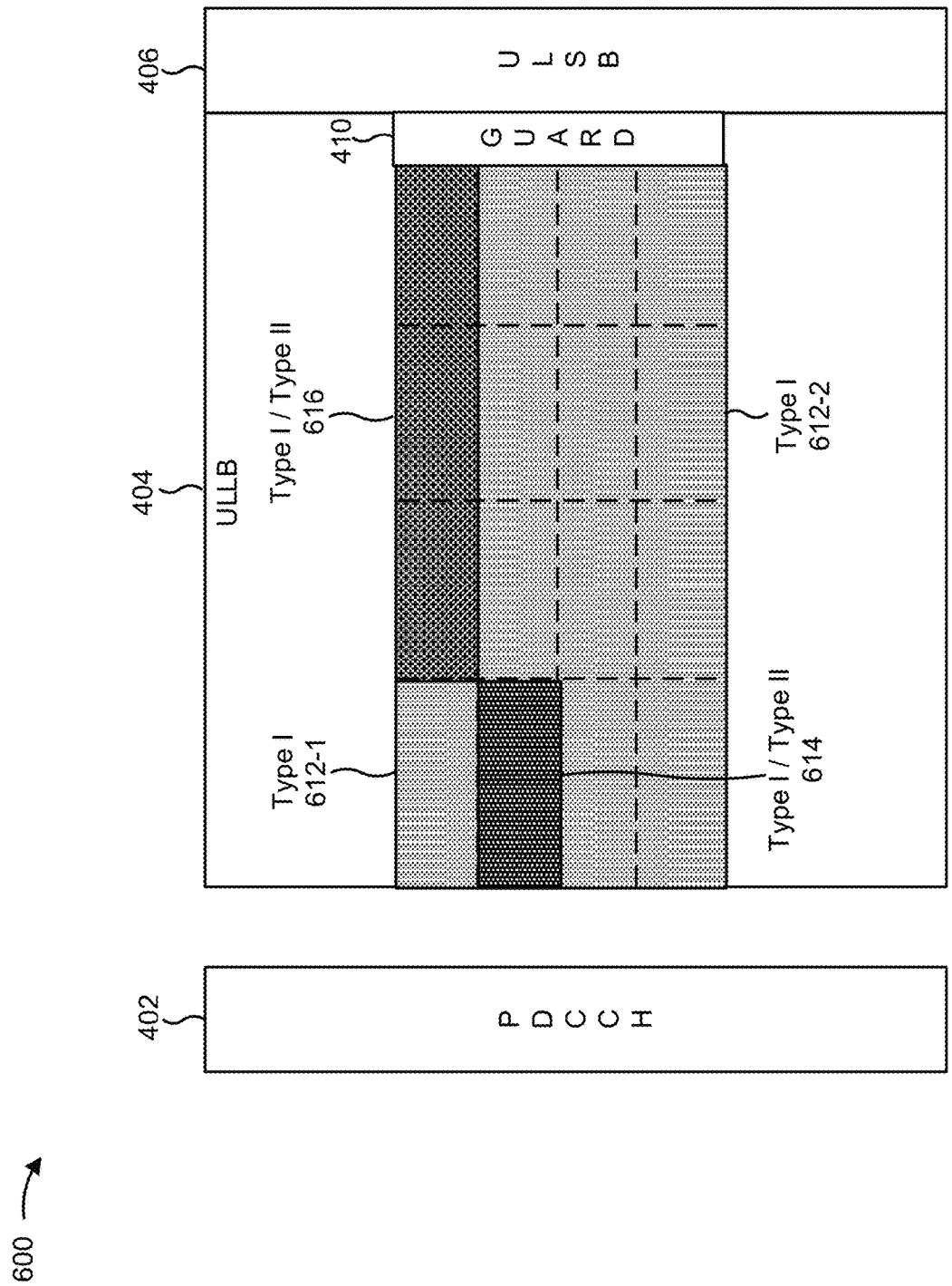

FIGS. 6A-6C are diagrams illustrating an example 600 of resource allocations within a grid of units in an uplink-centric slot for multiple types of random access transmission.

As shown in FIG. 6A, a first resource allocation may include type I resource allocations 602-1 and 602-2 and type II resource allocations 604-1 and 604-2. Type I resource allocations 602-1 and 602-2 may include resource allocations (e.g., units 412 of resources associated with one or more frequencies, times, cyclic shifts, etc.) for the first type of random access transmission shown in FIG. 3A. Type II resource allocations 604-1 and 604-2 may include resource allocations for the second type of random access transmission shown in FIG. 3B. In this case, resource allocations for the first type of random access transmission and the second type of random access transmission are non-overlapping (i.e., disjoint) resource allocations. In other words, type I resource allocations 602-1 and 602-2 are associated with different frequencies, different times, and/or different cyclic shifts, within random access channel portion 408 of the uplink-centric slot, than type II resource allocations 604-1 and 604-2.

As shown in FIG. 6B, a second resource allocation may include type I resource allocations 606-1 and 606-2, type II resource allocation 608, and type I/type II resource allocation 610. Type I resource allocations 606-1 and 606-2 may include resource allocations for the first type of random access transmission shown in FIG. 3A. Type II resource allocation 608 may include resource allocations for the second type of random access transmission shown in FIG. 3B. Type I/type II resource allocation 610 may include a shared resource allocation of units for utilization for the first type of random access transmission and/or the second type of random access transmission. For example, a first UE 120 may utilize a particular root unit 412 (e.g., a common frequency resource and time resource) with a first cyclic shift for a cyclic prefix and preamble for the first type of random access transmission, and a second UE 120 may utilize the same particular root unit 412 with a second, different cyclic shift for another cyclic prefix and another preamble for the second type of random access transmission. In this case, a base station 110 may determine whether the preamble is associated with the first type of random access transmission or the second type of random access transmission, such as based at least in part on the cyclic shift.

As shown in FIG. 6C, a third resource allocation may include type I resource allocations 612-1 and 612-2, type I/type II resource allocation 614, and type I/type II resource allocation 616. Type I resource allocations 612-1 and 612-2 may include resource allocations for the first type of random access transmission shown in FIG. 3A. Type I/type II resource allocation 614 may include a shared resource allocation of units for utilization for a preamble of the first type of random access transmission and/or a preamble of the second type of random access transmission. Type I/type II resource allocation 616 may include a shared resource allocation of units for utilization for a preamble of the first type of random access transmission and/or a random access message for the second type of random access transmission. In some aspects, type I/type II resource allocation 614 may be utilized for the first type of random access transmission with a first cyclic shift and/or the second type of random access transmission with a second, different cyclic shift. In this case, UE 120 may transmit either a preamble of the first type of random access transmission using units 412 of type I/type II resource allocation 616 or a random access message of the second type of random access transmission using units 412 of type I/type II resource allocation 616, and a base station 110 may detect whether UE 120 transmitted a preamble of the first type of random access message, a preamble of the second type of random access message or one or more of a set of random access messages.

As indicated above, FIGS. 6A-6C are provided as examples. Other examples are possible and may differ from what was described with respect to FIGS. 6A-6C.

FIG. 7 is a flow chart of a method 700 of wireless communication. The method 700 may be performed by a UE (e.g., which may correspond to one or more of the UE 120, the apparatus 800/800', user equipment 1150, and/or the like).

At 710, in some aspects, the UE receives base station signaling identifying a schedule for resources of a random access channel portion of a slot (block 710). For example, a first type of random access transmission may be scheduled for first resources of the random access channel portion of the slot and a second type of random access transmission may be scheduled for second resources of the random access channel portion of the slot. In some aspects, the first resources may be separate from the second resources.

At 720, the UE determines whether to transmit at least one of a first type of random access transmission or a second type of random access transmission within the random access channel portion of the slot (block 720). For example, the UE may determine whether to transmit the at least one of the first type of random access transmission or the second type of random access transmission within the random access channel portion of the slot. In this case, the UE may determine whether to transmit the first type of random access transmission or the second type of random access transmission based at least in part on channel conditions, such as an SNR parameter, a Doppler parameter, and/or the like. In some aspects, the first type of random access transmission includes a preamble. In some aspects, the second type of random access transmission includes the preamble and a random access message.

In some aspects, the first type of random access transmission and the second type of random access transmission are each comprised of a common unit structure, the random access channel portion of the slot comprises a grid of units, and the preamble occupies one unit, of the grid of units, and the random access message occupies one unit of the grid of units. In some aspects, the second type of random access transmission includes a plurality of random access messages and each of the plurality of random access messages occupies a different unit of the grid of units.

In some aspects, the slot includes a downlink control portion, an uplink long burst portion, and an uplink short burst portion and the random access channel portion is configured within the uplink long burst portion. In some aspects, the first type of random access transmission is a first type of physical random access channel (PRACH) random access transmission, the second type of random access transmission is a second type of PRACH random access transmission, the preamble of the first type of PRACH random access transmission is a first random access channel (RACH) preamble, the preamble of the second type of PRACH random access transmission is a second RACH preamble, and the random access message is a RACH random access message.

At 730, the UE transmits the at least one of the first type of random access transmission or the second type of random access transmission within the random access channel portion of the slot (block 730). For example, the UE may transmit the at least one of the first type of random access transmission or the second type of random access transmission within the random access channel portion of the slot. In this case, the UE may transmit the first type of random access transmission or the second type of random access transmission to a base station to initiate a random access procedure, such as a physical random access channel (PRACH) random access procedure. Based at least in part on completing the random access procedure, the UE may be synchronized for uplink transmission and/or downlink transmission.

In some aspects, the first type of random access transmission and the second type of random access transmission are transmitted within the random access channel portion of the slot. In some aspects, the first type of random access transmission and the second type of random access transmission are transmitted using separate resources of the random access channel portion of the slot. In some aspects, a schedule for the separate resources is identified by base station signaling. In some aspects, the first type of random access transmission and the second type of random access transmission share at least one resource of the random access channel portion of the slot. In some aspects, the at least one resource is associated with a first cyclic shift for the first type of random access transmission and a second cyclic shift for the second type of random access transmission.

In some aspects, the at least one of the first type of random access transmission or the second type of random access transmission is transmitted for a number of repetitions within the random access channel portion of the slot. In some aspects, the number of repetitions is selected based at least in part on a set of channel conditions. In some aspects, the number of repetitions uses different resources of the random access channel portion of the slot. In some aspects, the different resources include at least one of different frequencies, different times, or different cyclic shifts within the random access channel portion of the slot. In some aspects, a schedule for the different resources, of the random access channel portion of the slot, is identified by base station signaling. In some aspects, a first number of repetitions is associated with a first user and a second number of repetitions is associated with a second user.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
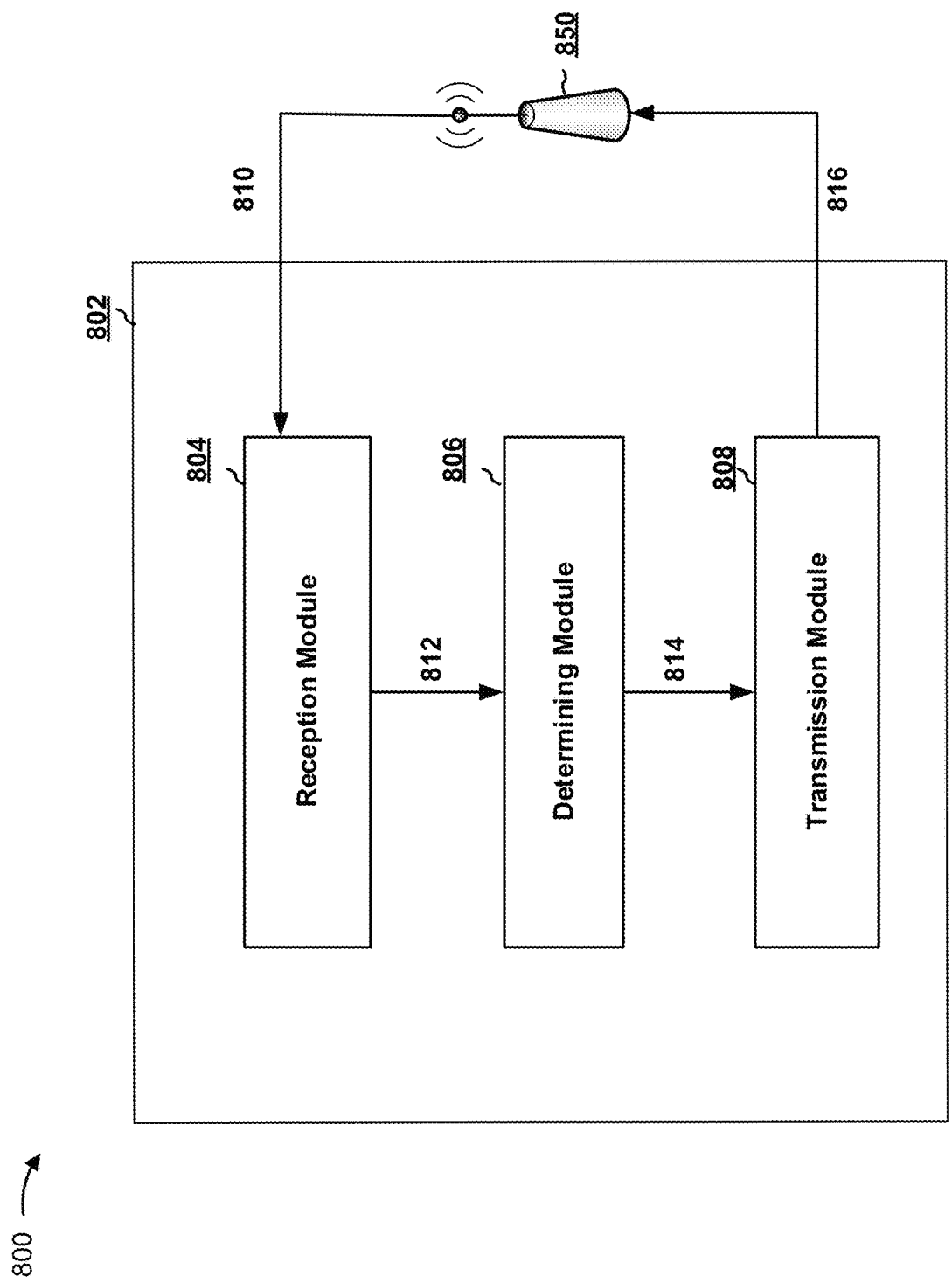
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a UE. In some aspects, the apparatus 802 includes a reception module 804, a determining module 806, and/or a transmission module 808.

The reception module 804 may receive, from a base station 850 and as data 810, one or more signaling messages, one or more network measurements, and/or the like. The one or more signaling messages may include one or more SIBs that may identify a resource allocation for a random access channel portion of a slot. The one or more signaling messages may identify a portion of the resource allocation reserved for a first type of random access transmission that includes a preamble, a second type of random access transmission that includes a preamble and a random access message, and/or the like. The random access channel portion of the slot may include a grid of units, and each unit may be allocatable to use for the preamble of the first type of random access transmission, the preamble of the second type of random access transmission, the random access message of the second type of random access transmission, and/or the like.

The determining module 806 may receive, from reception module 804 and as data 812, information indicating whether to transmit at least one of the first type of random access transmission or the second type of random access transmission. For example, based at least in part on a network measurement indicating a threshold SNR value, the determining module 806 may determine to transmit the second type of random access transmission. Alternatively, based at least in part on the network measurement indicating that the SNR value does not satisfy the threshold, the determining module 806 may determine to transmit the first type of random access transmission. In some aspects, the determining module 806 may determine a level of repetitions for the random access transmission, a set of units of a resource grid representing a set of allocatable resources to utilize to transmit the random access transmission, and/or the like.

The transmission module 808 may receive, from the determining module 806 and as data 814, information indicating whether to transmit the at least one of the first type of random access transmission or the second type of random access transmission within the random access channel portion of the slot based at least in part on the determining module 806 performing the determining. The transmission module 808 may transmit, to base station 850 and as data 816, the at least one of the first type of random access transmission or the second type of random access transmission within the random access channel portion of the slot based at least in part on receiving data 814.

The apparatus may include additional modules that perform each of the blocks of the algorithm in the aforementioned flow chart of FIG. 7. As such, each block in the aforementioned flow chart of FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
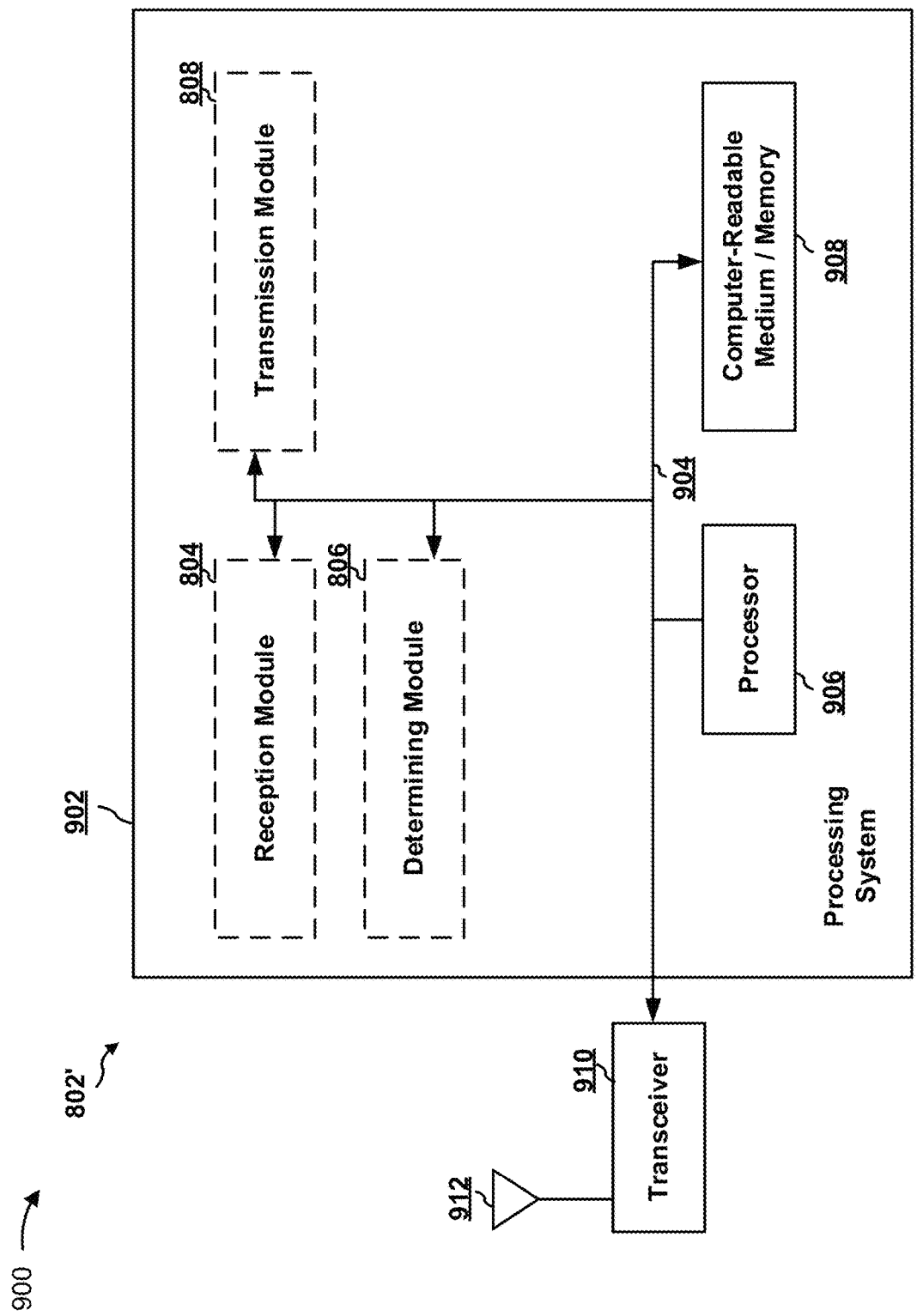
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a UE.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, and the computer-readable medium/memory 908. The bus 904 may also link various other circuits such as timing sources, peripherals, voltage regulators, and power management circuits, which are well known in the art, and therefore, will not be described any further.

The processing system 902 may be coupled to a transceiver 910. The transceiver 910 is coupled to one or more antennas 912. The transceiver 910 provides a means for communicating with various other apparatus over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 808, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described supra for any particular apparatus. The computer-readable medium/memory 908 may also be used for storing data that is manipulated by the processor 906 when executing software. The processing system further includes at least one of the modules 804, 806, and 808. The modules may be software modules running in the processor 906, resident/stored in the computer readable medium/memory 908, one or more hardware modules coupled to the processor 906, or some combination thereof. The processing system 902 may be a component of the UE 120 and may include the memory 282 and/or at least one of the TX MIMO processor 266, the RX processor 258, and/or the controller/processor 280.

In some aspects, the apparatus 802/802' for wireless communication includes means for determining whether to transmit at least one of a first type of random access transmission or a second type of random access transmission within a random access channel portion of a slot. In some aspects, the apparatus 802/802' for wireless communication includes means for transmitting the at least one of the first type of random access transmission or the second type of random access transmission within the random access channel portion of the slot. The aforementioned means may be one or more of the aforementioned modules of the apparatus 802 and/or the processing system 902 of the apparatus 802' configured to perform the functions recited by the aforementioned means. As described supra, the processing system 902 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 9 is provided as an example. Other examples are possible and may differ from what was described in connection with FIG. 9.

FIG. 10 is a flow chart of a method 1000 of wireless communication. The method 1000 may be performed by a BS (e.g., which may correspond to one or more of the BS 110, the base station 850, the apparatus 1100/1100', and/or the like).

At 1010, in some aspects, the BS provides base station signaling identifying a schedule for resources of a random access channel portion of a slot (block 1010). For example, a first type of random access transmission may be scheduled for first resources of the random access channel portion of the slot and a second type of random access transmission may be scheduled for second resources of the random access channel portion of the slot. In some aspects, the first resources may be separate from the second resources.

At 1020, the BS monitors for both a first type of random access transmission and a second type of random access transmission within the random access channel portion of the slot (block 1020). For example, the BS may monitor for the first type of random access transmission, which may include a preamble, and the second type of random access transmission, which may include a preamble and a random access message, to enable a user equipment (e.g., UE 120, the apparatus 800/800', user equipment 1150, and/or the like) to transmit at least one of the first type of random access transmission or the second type of random access transmission.

In some aspects, the first type of random access transmission and the second type of random access transmission are each comprised of a common unit structure, the random access channel portion of the slot comprises a grid of units, and the preamble occupies one unit, of the grid of units, and the random access message occupies one unit of the grid of units. In some aspects, the second type of random access transmission includes a plurality of random access messages, and each of the plurality of random access messages occupies a different unit of the grid of units. In some aspects, the first type of random access transmission and the second type of random access transmission are received within the random access channel portion of the slot.

In some aspects, the first type of random access transmission and the second type of random access transmission are received using separate resources of the random access channel portion of the slot. In some aspects, a schedule for the separate resources is identified by base station signaling. In some aspects, the first type of random access transmission and the second type of random access transmission share at least one resource of the random access channel portion of the slot. In some aspects, the at least one resource is associated with a first cyclic shift for the first type of random access transmission and a second cyclic shift for the second type of random access transmission.

At 1030, the BS receives, from at least one user equipment, at least one of the first type of random access transmission or the second type of random access transmission within the random access channel portion of the slot based at least in part on monitoring for both the first type of random access transmission and the second type of random access transmission (block 1030). For example, the BS may receive the first type of random access transmission based at least in part on monitoring for both the first type of random access transmission and the second type of random access transmission. Additionally, or alternatively, the BS may receive the second type of random access transmission based at least in part on monitoring for both the first type of random access transmission and the second type of random access transmission. Additionally, or alternatively, the BS may receive both the first type of random access transmission and the second type of random access transmission based at least in part on monitoring for both the first type of random access transmission and the second type of random access transmission.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
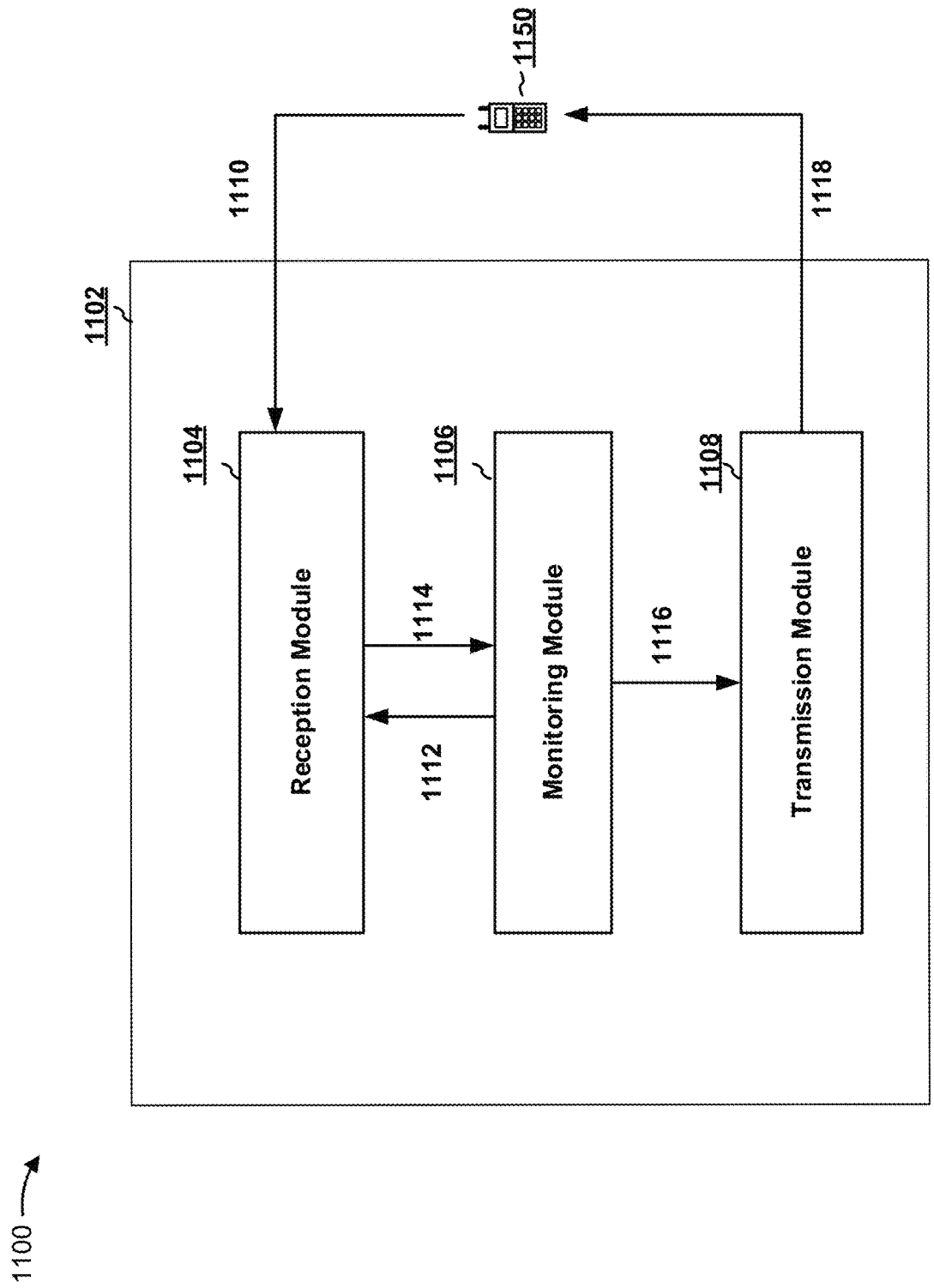
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be a BS. In some aspects, the apparatus 1102 includes a reception module 1104, a monitoring module 1106, and/or a transmission module 1108.

The reception module 1104 may receive, from a user equipment 1150 and as data 1110 and/or data 1112, information identifying a random access transmission. For example, based at least in part on the monitoring module 1106 indicating that the reception module 1104 is to monitor for both a first type of random access transmission and a second type of random access transmission within a random access channel portion of a slot, the reception module 1104 may receive at least one of the first type of random access transmission or the second type of random access transmission within the random access channel portion of the slot.

The monitoring module 1106 may receive, from the reception module 1104 and as data 1114, information associated with a random access transmission. For example, the monitoring module 1106 may receive an acknowledgement message from the user equipment 1150 indicating an acknowledgement of a schedule for random access transmissions provided by the transmission module 1108. In some aspects, the first type of random access transmission and the second type of random access transmission may be scheduled for separate resources of the random access channel portion of the slot.

The transmission module 1108 may receive, from the monitoring module 1106 and as data 1116, information associated with a random access transmission. For example, the transmission module 1108 may receive information indicating receipt of a random access transmission by the reception module 1104 based at least in part on the monitoring module 1106 causing the reception module 1104 to receive the random access transmission. In this case, the transmission module 1108 may provide data 1118 to user equipment 1150 to acknowledge receipt of the first type of random access transmission or the second type of random access transmission. Additionally or alternatively, the transmission module 1108 may provide base station signaling identifying a schedule for the user equipment 1150 to use to transmit at least one of the first type of random access transmission or the second type of random access transmission.

The apparatus may include additional modules that perform each of the blocks of the algorithm in the aforementioned flow chart of FIG. 10. As such, each block in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
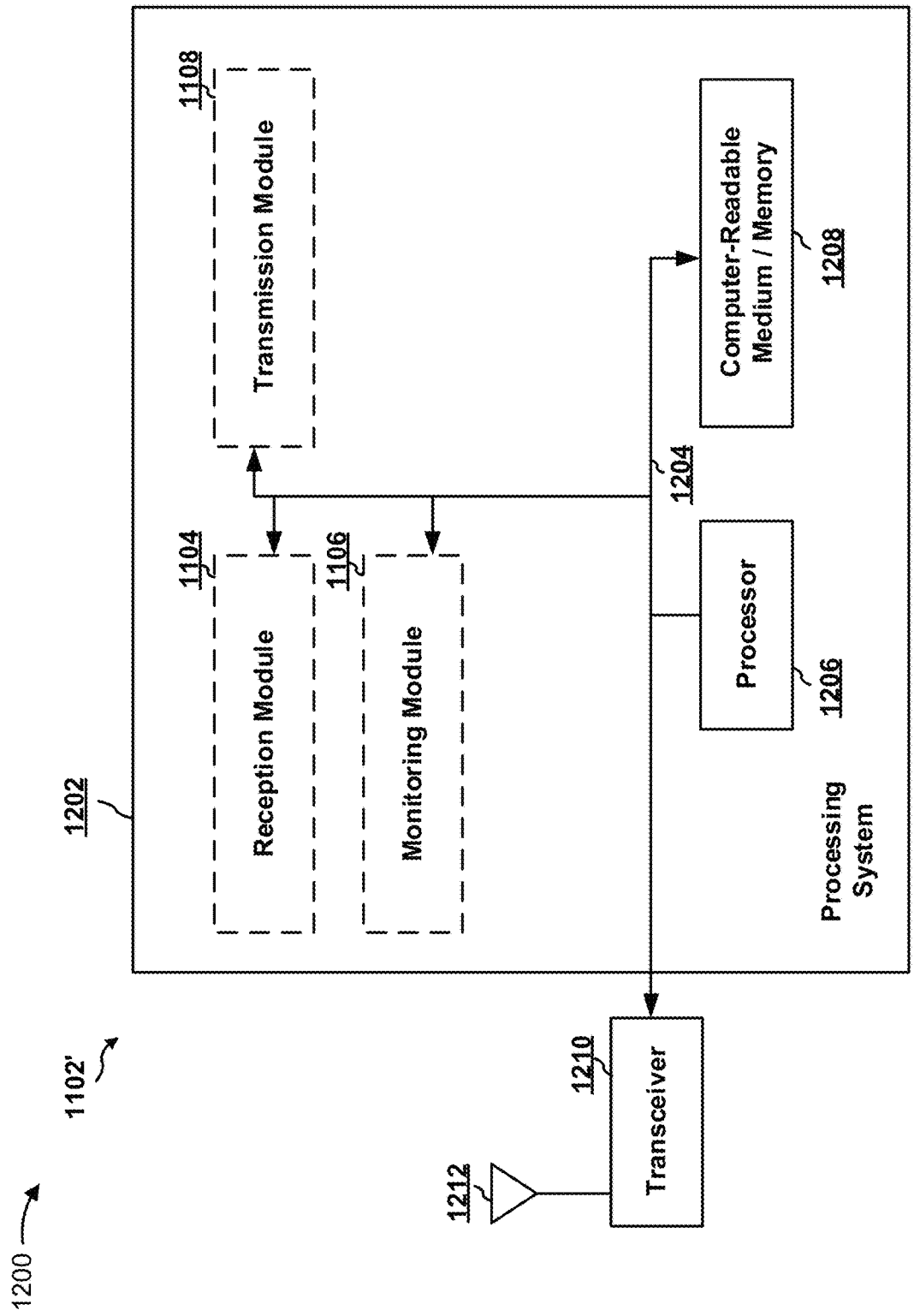
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a BS.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1108, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, and 1108. The modules may be software modules running in the processor 1206, resident/stored in the computer readable medium/memory 1208, one or more hardware modules coupled to the processor 1206, or some combination thereof. The processing system 1202 may be a component of the BS 110 and may include the memory 242 and/or at least one of the TX MIMO processor 230, the RX processor 238, and/or the controller/processor 240.

In some aspects, the apparatus 1102/1102' for wireless communication includes means for monitoring for both a first type of random access transmission and a second type of random access transmission within a random access channel portion of a slot. In some aspects, the apparatus 1102/1102' for wireless communication includes means for receiving, from at least one user equipment, at least one of the first type of random access transmission or the second type of random access transmission within the random access channel portion of the slot based at least in part on monitoring for both the first type of random access transmission and the second type of random access transmission. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 230, the RX processor 238, and/or the controller/processor 240. As such, in one configuration, the aforementioned means may be the TX MIMO processor 230, the RX processor 238, and/or the controller/processor 240 configured to perform the functions recited by the aforementioned means.

FIG. 12 is provided as an example. Other examples are possible and may differ from what was described in connection with FIG. 12.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
   determining, by a user equipment and based on a channel condition, whether to transmit at least one of a first type of random access transmission or a second type of random access transmission within a random access channel portion of a slot,
      wherein the random access channel portion of the slot is used to obtain access to a network for at least one of uplink communication or downlink communication,
      wherein the first type of random access transmission includes a preamble,
      wherein the second type of random access transmission includes the preamble and a random access message,
      wherein the first type of random access transmission and the second type of random access transmission are each comprised of a common unit structure,
      wherein the random access channel portion of the slot comprises a grid of units, wherein the first type of random access transmission is assigned to a first unit, of the grid of units, associated with a frequency and a first time,
wherein the second type of random access transmission is assigned to a second unit, of the grid of units, associated with the frequency and a second time, and
wherein the first unit and the second unit are non-overlapping; and
transmitting, by the user equipment, the at least one of the first type of random access transmission or the second type of random access transmission within the random access channel portion of the slot.

2. The method of claim 1,
wherein the preamble occupies one unit, of the grid of units, and the random access message occupies one unit of the grid of units.

3. The method of claim 2, wherein the second type of random access transmission includes a plurality of random access messages; and
wherein each of the plurality of random access messages occupies a different unit of the grid of units.

4. The method of claim 1, wherein the first type of random access transmission and the second type of random access transmission are transmitted within the random access channel portion of the slot.

5. The method of claim 4, wherein the first type of random access transmission and the second type of random access transmission are transmitted using separate resources of the random access channel portion of the slot.

6. The method of claim 5, wherein a schedule for the separate resources is identified by base station signaling.

7. The method of claim 4, wherein the first type of random access transmission and the second type of random access transmission share at least one resource of the random access channel portion of the slot.

8. The method of claim 7, wherein the at least one resource is associated with a first cyclic shift for the first type of random access transmission and a second cyclic shift for the second type of random access transmission.

9. The method of claim 1, wherein the at least one of the first type of random access transmission or the second type of random access transmission is transmitted for a number of repetitions within the random access channel portion of the slot.

10. The method of claim 9, wherein the number of repetitions is selected based at least in part on a set of channel conditions.

11. The method of claim 9, wherein the number of repetitions uses different resources of the random access channel portion of the slot,
wherein a third unit, of the grid of units, is reserved for a first level of repetition for the second type of random access transmission, and
wherein a fourth unit, of the grid of units, is reserved for a second level of repetition for the second type of random access transmission.

12. The method of claim 11, wherein the different resources include at least one of different frequencies, different times, or different cyclic shifts within the random access channel portion of the slot.

13. The method of claim 11, wherein a schedule for the different resources, of the random access channel portion of the slot, is identified by base station signaling.

14. The method of claim 9, wherein a first number of repetitions is associated with a first user and a second number of repetitions is associated with a second user.

15. The method of claim 1, wherein the slot includes a downlink control portion, an uplink long burst portion, and an uplink short burst portion,
wherein the random access channel portion is configured within the uplink long burst portion.

16. The method of claim 1, wherein the channel condition includes at least one of a signal to noise ratio (SNR) parameter or a Doppler parameter.

17. The method of claim 1, wherein the first type of random access transmission is a first type of physical random access channel (PRACH) random access transmission,
wherein the second type of random access transmission is a second type of PRACH random access transmission,
wherein the preamble of the first type of PRACH random access transmission is a first random access channel (RACH) preamble,
wherein the preamble of the second type of PRACH random access transmission is a second RACH preamble, and
wherein the random access message is a RACH random access message.

18. A device for wireless communication, comprising:
memory; and
one or more processors coupled to the memory, the memory and the one or more processors configured to:
determine, based on a channel condition, whether to transmit at least one of a first type of random access transmission or a second type of random access transmission within a random access channel portion of a slot,
wherein the random access channel portion of the slot is used to obtain access to a network for at least one of uplink communication or downlink communication,
wherein the first type of random access transmission includes a preamble,
wherein the second type of random access transmission includes the preamble and a random access message,
the first type of random access transmission and the second type of random access transmission are each comprised of a common unit structure,
wherein the random access channel portion of the slot comprises a grid of units,
wherein the first type of random access transmission is assigned to a first unit, of the grid of units, associated with a frequency and a first time,
wherein the second type of random access transmission is assigned to a second unit, of the grid of units, associated with the frequency and a second time, and
wherein the first unit and the second unit are non-overlapping; and
transmit the at least one of the first type of random access transmission or the second type of random access transmission within the random access channel portion of the slot.

19. The device of claim 18,
wherein the preamble occupies one unit, of the grid of units, and the random access message occupies one unit of the grid of units.

20. The device of claim 19, wherein the second type of random access transmission includes a plurality of random access messages; and
wherein each of the plurality of random access messages occupies a different unit of the grid of units.

21. The device of claim 18, wherein the first type of random access transmission and the second type of random access transmission are transmitted within the random access channel portion of the slot.

22. The device of claim 21, wherein the first type of random access transmission and the second type of random access transmission are transmitted using separate resources of the random access channel portion of the slot.

23. The device of claim 22, wherein a schedule for the separate resources is identified by base station signaling.

24. The device of claim 21, wherein the first type of random access transmission and the second type of random access transmission share at least one resource of the random access channel portion of the slot.

25. The device of claim 24, wherein the at least one resource is associated with a first cyclic shift for the first type of random access transmission and a second cyclic shift for the second type of random access transmission.

26. The device of claim 18, wherein the at least one of the first type of random access transmission or the second type of random access transmission is transmitted for a number of repetitions within the random access channel portion of the slot.

27. The device of claim 26, wherein the number of repetitions is selected based at least in part on a set of channel conditions.

28. The device of claim 26, wherein the number of repetitions uses different resources of the random access channel portion of the slot,
wherein a third unit, of the grid of units, is reserved for a first level of repetition for the second type of random access transmission, and
wherein a fourth unit, of the grid of units, is reserved for a second level of repetition for the second type of random access transmission.

29. The device of claim 28, wherein the different resources include at least one of different frequencies, different times, or different cyclic shifts within the random access channel portion of the slot.

30. The device of claim 28, wherein a schedule for the different resources, of the random access channel portion of the slot, is identified by base station signaling.

31. The device of claim 26, wherein a first number of repetitions is associated with a first user and a second number of repetitions is associated with a second user.

32. The device of claim 18, wherein the slot includes a downlink control portion, an uplink long burst portion, and an uplink short burst portion,
wherein the random access channel portion is configured within the uplink long burst portion.

33. The device of claim 18, wherein the first type of random access transmission is a first type of physical random access channel (PRACH) random access transmission,
wherein the second type of random access transmission is a second type of PRACH random access transmission,
wherein the preamble of the first type of PRACH random access transmission is a first random access channel (RACH) preamble,
wherein the preamble of the second type of PRACH random access transmission is a second RACH preamble, and wherein the random access message is a RACH random access message.

34. An apparatus for wireless communication, comprising:
means for determining, based on a channel condition, whether to transmit at least one of a first type of random access transmission or a second type of random access transmission within a random access channel portion of a slot,
wherein the random access channel portion of the slot is used to obtain access to a network for at least one of uplink communication or downlink communication,
wherein the first type of random access transmission includes a preamble,
wherein the second type of random access transmission includes the preamble and a random access message,
wherein the means for determining is at least partially implemented in hardware,
wherein the first type of random access transmission and the second type of random access transmission are each comprised of a common unit structure,
wherein the random access channel portion of the slot comprises a grid of units,
wherein the first type of random access transmission is assigned to a first unit, of the grid of units, associated with a frequency and a first time,
wherein the second type of random access transmission is assigned to a second unit, of the grid of units, associated with the frequency and a second time, and
wherein the first unit and the second unit are non-overlapping; and
means for transmitting the at least one of the first type of random access transmission or the second type of random access transmission within the random access channel portion of the slot.

35. The apparatus of claim 34,
wherein the preamble occupies one unit, of the grid of units, and the random access message occupies one unit of the grid of units.

36. The apparatus of claim 35, wherein the second type of random access transmission includes a plurality of random access messages; and
wherein each of the plurality of random access messages occupies a different unit of the grid of units.

37. The apparatus of claim 34, wherein the first type of random access transmission and the second type of random access transmission are transmitted within the random access channel portion of the slot.

38. The apparatus of claim 37, wherein the first type of random access transmission and the second type of random access transmission are transmitted using separate resources of the random access channel portion of the slot.

39. The apparatus of claim 38, wherein a schedule for the separate resources is identified by base station signaling.

40. The apparatus of claim 37, wherein the first type of random access transmission and the second type of random access transmission share at least one resource of the random access channel portion of the slot.

41. The apparatus of claim 40, wherein the at least one resource is associated with a first cyclic shift for the first type of random access transmission and a second cyclic shift for the second type of random access transmission.

42. The apparatus of claim 34, wherein the at least one of the first type of random access transmission or the second type of random access transmission is transmitted for a number of repetitions within the random access channel portion of the slot.

43. The apparatus of claim 42, wherein the number of repetitions is selected based at least in part on a set of channel conditions.

44. The apparatus of claim 42, wherein the number of repetitions uses different resources of the random access channel portion of the slot,
 wherein a third unit, of the grid of units, is reserved for a first level of repetition for the second type of random access transmission, and
 wherein a fourth unit, of the grid of units, is reserved for a second level of repetition for the second type of random access transmission.

45. The apparatus of claim 44, wherein the different resources include at least one of different frequencies, different times, or different cyclic shifts within the random access channel portion of the slot.

46. The apparatus of claim 44, wherein a schedule for the different resources, of the random access channel portion of the slot, is identified by base station signaling.

47. The apparatus of claim 42, wherein a first number of repetitions is associated with a first user and a second number of repetitions is associated with a second user.

48. The apparatus of claim 34, wherein the slot includes a downlink control portion, an uplink long burst portion, and an uplink short burst portion,
 wherein the random access channel portion is configured within the uplink long burst portion.

49. The apparatus of claim 34, wherein the first type of random access transmission is a first type of physical random access channel (PRACH) random access transmission,
 wherein the second type of random access transmission is a second type of PRACH random access transmission,
 wherein the preamble of the first type of PRACH random access transmission is a first random access channel (RACH) preamble,
 wherein the preamble of the second type of PRACH random access transmission is a second RACH preamble, and
 wherein the random access message is a RACH random access message.

50. A non-transitory computer-readable medium storing instructions for wireless communication, the instructions comprising:
 one or more instructions that, when executed by one or more processors of a device, cause the one or more processors to:
  determine, based on a channel condition, whether to transmit at least one of a first type of random access transmission or a second type of random access transmission within a random access channel portion of a slot,
   wherein the random access channel portion of the slot is used to obtain access to a network for at least one of uplink communication or downlink communication,
   wherein the first type of random access transmission includes a preamble,
   wherein the second type of random access transmission includes the preamble and a random access message,
   wherein the first type of random access transmission and the second type of random access transmission are each comprised of a common unit structure,
   wherein the random access channel portion of the slot comprises a grid of units,
   wherein the first type of random access transmission is assigned to a first unit, of the grid of units, associated with a frequency and a first time, and
   wherein the second type of random access transmission is assigned to a second unit, of the grid of units, associated with the frequency and a second time, and
   wherein the first unit and the second unit are non-overlapping; and
  transmit the at least one of the first type of random access transmission or the second type of random access transmission within the random access channel portion of the slot.

51. The non-transitory computer-readable medium of claim 50,
 wherein the preamble occupies one unit, of the grid of units, and the random access message occupies one unit of the grid of units.

52. A method for wireless communication, comprising:
 determining, by a base station, whether to receive at least one of a first type of random access transmission or a second type of random access transmission within a random access channel portion of a slot,
  wherein the random access channel portion of the slot is used to obtain access to a network for at least one of uplink communication or downlink communication,
  wherein the first type of random access transmission includes a preamble, and
  wherein the second type of random access transmission includes the preamble and a random access message,
  wherein the first type of random access transmission and the second type of random access transmission are each comprised of a common unit structure,
  wherein the random access channel portion of the slot comprises a grid of units,
  wherein the first type of random access transmission is assigned to a first unit, of the grid of units, associated with a frequency and a first time, and
  wherein the second type of random access transmission is assigned to a second unit, of the grid of units, associated with the frequency and a second time,
  wherein the first unit and the second unit are non-overlapping; and
 receiving, by the base station, the at least one of the first type of random access transmission or the second type of random access transmission within the random access channel portion of the slot.

53. The method of claim 52,
 wherein the preamble occupies one unit, of the grid of units, and the random access message occupies one unit of the grid of units.

54. The method of claim 53, wherein the second type of random access transmission includes a plurality of random access messages; and
 wherein each of the plurality of random access messages occupies a different unit of the grid of units.

55. The method of claim 52, wherein the first type of random access transmission and the second type of random access transmission are transmitted within the random access channel portion of the slot.

56. The method of claim 55, wherein the first type of random access transmission and the second type of random access transmission are transmitted using separate resources of the random access channel portion of the slot.

57. The method of claim 56, wherein a schedule for the separate resources is identified by base station signaling.

58. The method of claim 55, wherein the first type of random access transmission and the second type of random access transmission share at least one resource of the random access channel portion of the slot.

59. The method of claim 58, wherein the at least one resource is associated with a first cyclic shift for the first type of random access transmission and a second cyclic shift for the second type of random access transmission.

60. A device for wireless communication, comprising:
memory; and
one or more processors coupled to the memory, the memory and the one or more processors configured to:
determine whether to receive at least one of a first type of random access transmission or a second type of random access transmission within a random access channel portion of a slot,
wherein the random access channel portion of the slot is used to obtain access to a network for at least one of uplink communication or downlink communication,
wherein the first type of random access transmission includes a preamble,
wherein the second type of random access transmission includes the preamble and a random access message,
wherein the first type of random access transmission and the second type of random access transmission are each comprised of a common unit structure,
wherein the random access channel portion of the slot comprises a grid of units,
the first type of random access transmission is assigned to a first unit, of the grid of units, associated with a frequency and a first time,
wherein the second type of random access transmission is assigned to a second unit, of the grid of units, associated with the frequency and a second time,
wherein the first unit and the second unit are non-overlapping; and
receive the at least one of the first type of random access transmission or the second type of random access transmission within the random access channel portion of the slot.

61. The device of claim 60,
wherein the preamble occupies one unit, of the grid of units, and the random access message occupies one unit of the grid of units.

62. The device of claim 61, wherein the second type of random access transmission includes a plurality of random access messages; and
wherein each of the plurality of random access messages occupies a different unit of the grid of units.

63. The device of claim 60, wherein the first type of random access transmission and the second type of random access transmission are transmitted within the random access channel portion of the slot.

64. The device of claim 63, wherein the first type of random access transmission and the second type of random access transmission are transmitted using separate resources of the random access channel portion of the slot.

65. The device of claim 64, wherein a schedule for the separate resources is identified by base station signaling.

66. The device of claim 63, wherein the first type of random access transmission and the second type of random access transmission share at least one resource of the random access channel portion of the slot.

67. The device of claim 66, wherein the at least one resource is associated with a first cyclic shift for the first type of random access transmission and a second cyclic shift for the second type of random access transmission.

68. An apparatus for wireless communication, comprising:
means for determining whether to receive at least one of a first type of random access transmission or a second type of random access transmission within a random access channel portion of a slot,
wherein the random access channel portion of the slot is used to obtain access to a network for at least one of uplink communication or downlink communication,
wherein the first type of random access transmission includes a preamble,
wherein the second type of random access transmission includes the preamble and a random access message,
wherein the first type of random access transmission and the second type of random access transmission are each comprised of a common unit structure,
wherein the random access channel portion of the slot comprises a grid of units,
wherein the first type of random access transmission is assigned to a first unit, of the grid of units, associated with a frequency and a first time,
wherein the second type of random access transmission is assigned to a second unit, of the grid of units, associated with the frequency and a second time,
wherein the means for determining is at least partially implemented in hardware, and
wherein the first unit and the second unit are non-overlapping; and
means for receiving the at least one of the first type of random access transmission or the second type of random access transmission within the random access channel portion of the slot.

69. The apparatus of claim 68,
wherein the preamble occupies one unit, of the grid of units, and the random access message occupies one unit of the grid of units.

70. The apparatus of claim 69, wherein the second type of random access transmission includes a plurality of random access messages; and
wherein each of the plurality of random access messages occupies a different unit of the grid of units.

71. The apparatus of claim 68, wherein the first type of random access transmission and the second type of random access transmission are transmitted within the random access channel portion of the slot.

72. The apparatus of claim 71, wherein the first type of random access transmission and the second type of random access transmission are transmitted using separate resources of the random access channel portion of the slot.

73. The apparatus of claim 72, wherein a schedule for the separate resources is identified by base station signaling.

74. The apparatus of claim 71, wherein the first type of random access transmission and the second type of random access transmission share at least one resource of the random access channel portion of the slot.

75. The apparatus of claim 74, wherein the at least one resource is associated with a first cyclic shift for the first type of random access transmission and a second cyclic shift for the second type of random access transmission.

76. A non-transitory computer-readable medium storing instructions for wireless communication, the instructions comprising:

one or more instructions that, when executed by one or more processors of a device, cause the one or more processors to:
determine whether to receive at least one of a first type of random access transmission or a second type of random access transmission within a random access channel portion of a slot,
wherein the random access channel portion of the slot is used to obtain access to a network for at least one of uplink communication or downlink communication,
wherein the first type of random access transmission includes a preamble,
wherein the second type of random access transmission includes the preamble and a random access message,
wherein the first type of random access transmission and the second type of random access transmission are each comprised of a common unit structure,
wherein the random access channel portion of the slot comprises a grid of units,
wherein the first type of random access transmission is assigned to a first unit, of the grid of units, associated with a frequency and a first time,
wherein the second type of random access transmission is assigned to a second unit, of the grid of units, associated with the frequency and a second time, and
wherein the first unit and the second unit are non-overlapping; and
receive the at least one of the first type of random access transmission or the second type of random access transmission within the random access channel portion of the slot.

77. The non-transitory computer-readable medium of claim 76,
wherein the preamble occupies one unit, of the grid of units, and the random access message occupies one unit of the grid of units.

78. The device of claim 77, wherein the second type of random access transmission includes a plurality of random access messages; and
wherein each of the plurality of random access messages occupies a different unit of the grid of units.

79. The device of claim 76, wherein the first type of random access transmission and the second type of random access transmission are transmitted within the random access channel portion of the slot.

80. The device of claim 79, wherein the first type of random access transmission and the second type of random access transmission are transmitted using separate resources of the random access channel portion of the slot.

81. The device of claim 80, wherein a schedule for the separate resources is identified by base station signaling.

* * * * *